United States Patent [19]
Bernhardt et al.

[11] Patent Number: 5,007,336
[45] Date of Patent: Apr. 16, 1991

[54] APPARATUS FOR TREATING SLAUGHTERED ANIMALS

[75] Inventors: Douglas H. Bernhardt, Minnetonka; Guillermo R. Matheu, Eden Prairie; Spencer E. Crum, Minneapolis; John T. Adelmann, Prior Lake, all of Minn.

[73] Assignee: Meat Processing Service Corporation, Minneapolis, Minn.

[21] Appl. No.: 13,580

[22] Filed: Feb. 11, 1987

[51] Int. Cl.[5] .......................... A23B 4/00; A23L 3/34
[52] U.S. Cl. ......................................... 99/487; 99/532; 452/125; 452/141
[58] Field of Search ................. 99/532, 533, 535, 516; 17/1 R, 25, 42.1, 51

[56] References Cited

U.S. PATENT DOCUMENTS

| | | |
|---|---|---|
| 2,812,261 | 11/1957 | Wasserman . |
| 2,863,777 | 12/1958 | Dekker . |
| 4,053,963 | 10/1977 | Matheu . |
| 4,411,047 | 10/1983 | Norton ............................ 99/533 X |

FOREIGN PATENT DOCUMENTS

| | | |
|---|---|---|
| 573378 | 11/1958 | Canada . |
| 277 | 4/1970 | Guatemala . |
| 519494 | 10/1970 | Guatemala . |
| 2306 | 6/1971 | Guatemala . |
| 231323 | 2/1972 | Guatemala . |
| 112199 | 3/1972 | Guatemala . |
| 208678 | 3/1972 | Guatemala . |
| 424323 | 3/1972 | Guatemala . |
| 802126 | 10/1958 | United Kingdom . |

OTHER PUBLICATIONS

Abandoned U.S. application Ser. No. 645,309, filed Dec. 29, 1975 entitled Composition and Method for Preparing Meat.
Electrical Stimulation for Improving Meat Quality sponsored by Texas A & M University, date unknown.
Bibliography of technical papers and grants (Dr. Thayne Dutson), date unknown.

Primary Examiner—Timothy F. Simone
Attorney, Agent, or Firm—Vidas & Arrett

[57] ABSTRACT

Apparatus for controlled injection of treatment solution into slaughtered animals.

23 Claims, 15 Drawing Sheets

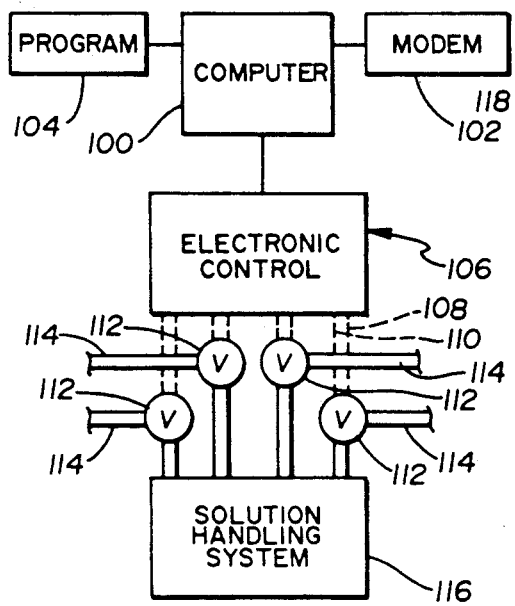
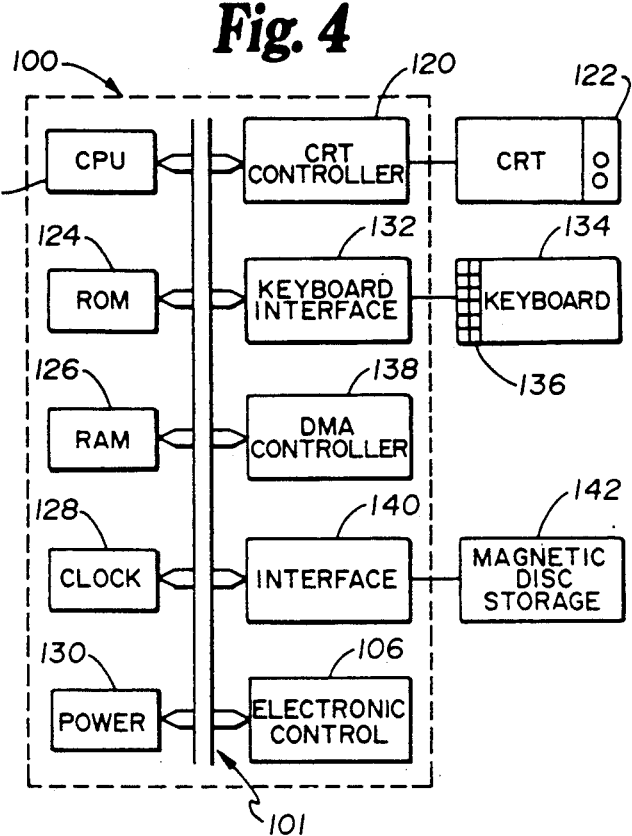
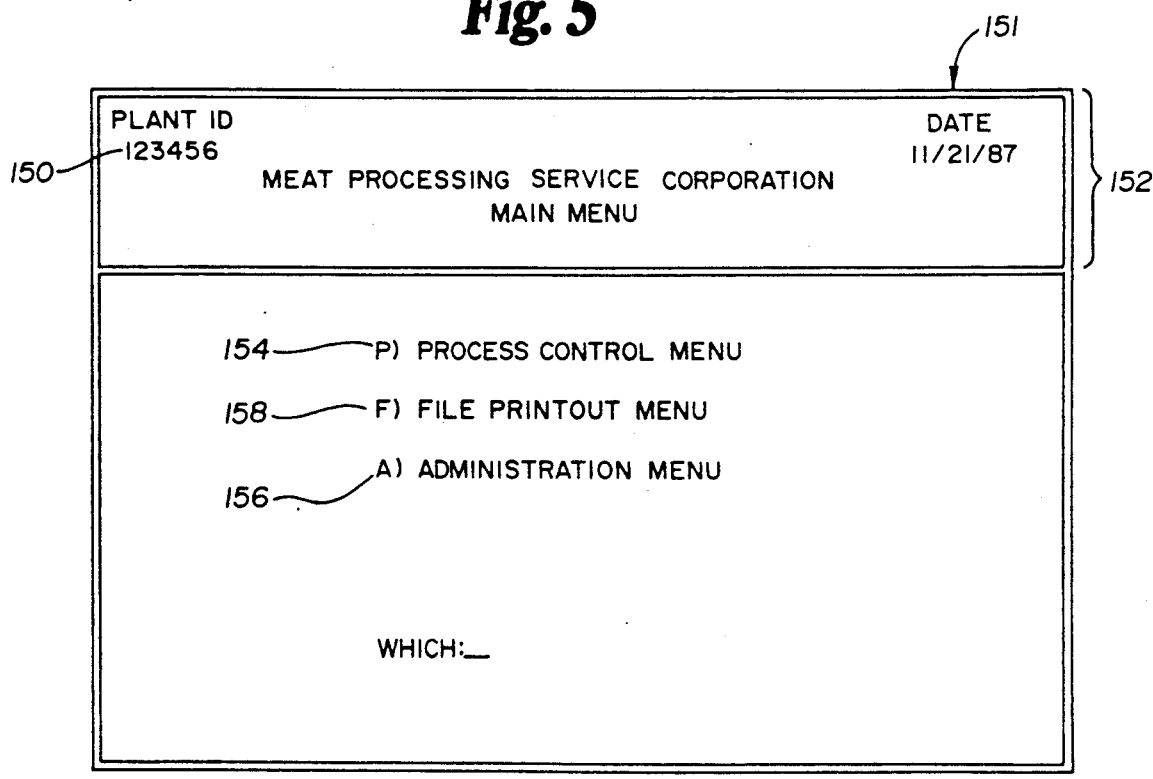

Fig. 6

| PLANT ID | | DATE |
|---|---|---|
| 123456 | MEAT PROCESSING SERVICE CORPORATION | 11/21/87 |
| | ADMINISTRATIVE MENU PASSWORD | |

OPERATOR

PASSWORD

Fig. 7

```
PLANT ID                                                    DATE
123456                                                    11/21/87
              MEAT PROCESSING SERVICE CORPORATION
                      ADMINISTRATION MENU

170 ——— P) CHANGE PASSWORDS

171 ——— O) CHANGE OPERATORS

172 ——— S) CHANGE SYSTEM INFORMATION

176 ——— C) COPY CUM & DLY FILES

178 ——— E) EXIT TO DOS

WHICH: __
```

Fig. 8

```
PLANT ID                                                    DATE
123456                                                    11/21/87
              MEAT PROCESSING SERVICE CORPORATION
                      CHANGE PASSWORD MENU

NUMBER             PASSWORD              DATE

1)   MPRC ————— 180 ————— ADMIN PW
         2)   ANTWERP ———— 182 ———— DAILY PW+
         3)   MINERVA  )              ( 12/31/86
         4)   WESLEY   )   — 184 —    ( 6/ 1/87
         5)   LADOGA   )              ( 6/ 1/87
         6)   QUEEN MARY)             ( 8/15/86

WHICH: __
```

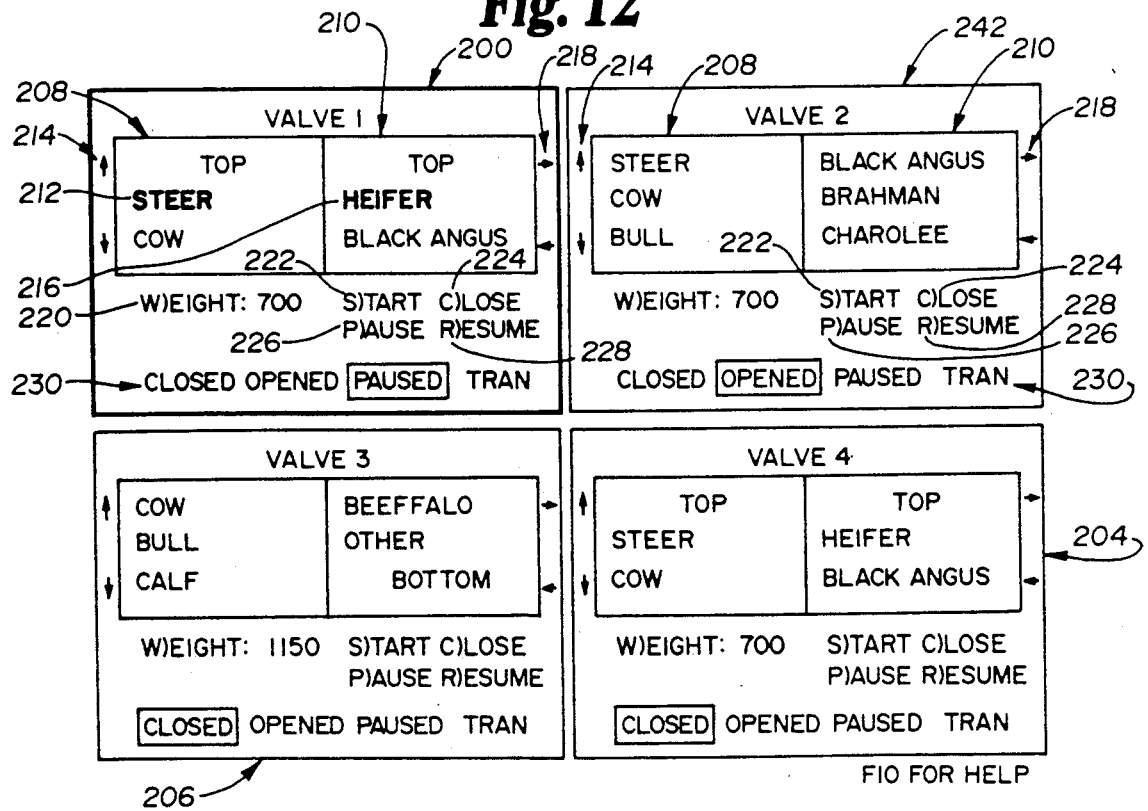

Fig. 10

```
PLANT ID                                                    DATE
123456                                                   11/21/87
         MEAT PROCESSING SERVICE CORPORATION
            PROCESS CONTROL MENU PASSWORD

OPERATOR

PASSWORD
```

Fig. 11

```
PLANT ID                                                    DATE
123456                                                   11/21/87
         MEAT PROCESSING SERVICE CORPORATION
                PROCESS CONTROL MENU

P) PROCESS CONTROL

R) RECIRCULATION CONTROL

WHICH: __
```

APPARATUS FOR TREATING SLAUGHTERED ANIMALS

BACKGROUND

The subject invention is related to and is an improvement over U.S. Pat. No. 4,053,963 and the various prior art cited therein, all of which is incorporated herein by reference. Generally, that prior art relates to meat treatment by injection of various liquid compositions and to apparatus for accomplishing same.

SUMMARY OF THE INVENTION

The subject invention is specifically concerned with improved apparatus for use in the treatment of slaughtered animals by injecting treatment solution into the animal's circulatory system. The apparatus is useful in the treatment of beef, horses, hogs, poultry, deer, buffalo and the like. The apparatus may be portable or permanently located.

It is to be understood that this invention is capable of using any of a variety of treatment solutions described in the prior art, especially aqueous solutions such as those referred to in U.S. Pat. No. 4,053,963 and its copending application (now abandoned) Ser. No. 645,309 filed Dec. 29, 1975, entitled "Composition and Method for Preparing Meat," and to later improved versions of such solutions. Examples are solutions of water and one or more of the following: maltose and dextrose, ascorbic acid, sodium tripolyphosphate, hydrolyzed milk protein, papain or bromelin or ficin, potassium sorbate, tetrasodium pyrophosphate and sodium citrate. Additionally, water soluble polysaccharide gum and/or calcium chloride, sodium chloride and potassium chloride may be included.

The procedure for using the apparatus of the invention begins with the stunning of a steer, for example, following which it is hung by its hind leg or hind legs, usually on an overhead conveyer or the like. Typically, the jugular vein is then opened at the neck to bleed the animal. Otherwise, in other techniques, the incision is made in the heart. The animal may then be laid on a work surface with its legs extending upwardly or it may be kept hanging. Preferably, all four leg vessels are severed, or all four legs are severed at the knee joints. An injector nozzle with a self-piercing tip is then inserted into the jugular at a location proximate to the earlier incision therein but closer to the heart. The injector nozzle, being attached to a dispensing conduit of the apparatus, allows treatment solution to be pumped from the apparatus, through the nozzle and into the animal's circulatory system. The solution, after forcing out residual blood, eventually exits from the severed leg vessels and from the first incision in the jugular vein.

It is critical that the injection solution be delivered into the animal's cardiovascular system at a consistent pressure which is not so low as to lead to incomplete distribution throughout the animal or so high as to rupture vessels. The improved apparatus of this invention provides in its most preferred embodiment for such consistent, controlled pressure. The improved apparatus in its most preferred embodiment is also computer controlled as to flow rate, dosage of treatment solution and data tabulations. It also provides for multi-line dispensing conduits or work stations.

An important feature of the apparatus comprises the use of an automatic control valve with a control system for control of downstream pressure to a steady value. This is accomplished by locating the downstream pressure sensor of the value's control system in a critical location, to be described more fully below, which provides substantially constant pressure values in single or multiple dispensing lines.

The apparatus also provides for cooling of the treatment solution. This "rapid chills" the animal and enhances the butchering and deboning of the carcass.

These and other features of the invention will become apparent from the detailed description provided below.

BRIEF DESCRIPTION OF THE DRAWINGS

FIG. 3 is a block diagram of the component parts of the apparatus;

FIG. 4 is a block diagram of the component parts of the microcomputer;

FIG. 5 is an embodiment of the program's Main menu displayed on a CRT;

FIG. 6 is an embodiment of the Administrative menu password screen;

FIG. 7 is an embodiment of the Administration menu displayed on a CRT;

FIG. 8 is an embodiment of the Change Password menu displayed on a CRT;

FIG. 9 is an embodiment of the Change System Information menu displayed on a CRT;

FIG. 10 is an embodiment of the process control menu password screen;

FIG. 11 is an embodiment of the process control menu;

FIG. 12 is an embodiment of the four Valve Operation Control screens simultaneously displayed on a CRT;

DESCRIPTION OF THE PREFERRED EMBODIMENTS

The apparatus of the invention is comprised of a computer control section and a solution handling section. The solution handling section includes a storage container or tank, pump, valves, hoses, pressure meters, nozzles and interconnecting conduits and the like. Stainless steel tankage, pipes, fittings, couplings, adapters, bushings and clamps along with vinyl food handling tubing and hoses are primarily used in constructing the solution handling equipment to render it sanitary and easy to clean. Such fittings and the like are commercially available. For example, stainless steel fittings, ties, clamps, bushings and adapters are available in a variety of sizes and configurations as needed from L. C. Thomsen & Sons, Inc. of Kenosha, Wis., PVC transfer hose, sometimes referred to as "milk hose" is available from Kuriyama of America, Inc., Elk Grove Village, IL 60007 and is identified by them as Tigerflex Milk Hose. Vinyl food handling tubing is readily available from Mayon Plastics of Hopkins, Minn. 55343 identified by them as Mayon Food Tubing, Grade R206-1.

Figure 1:
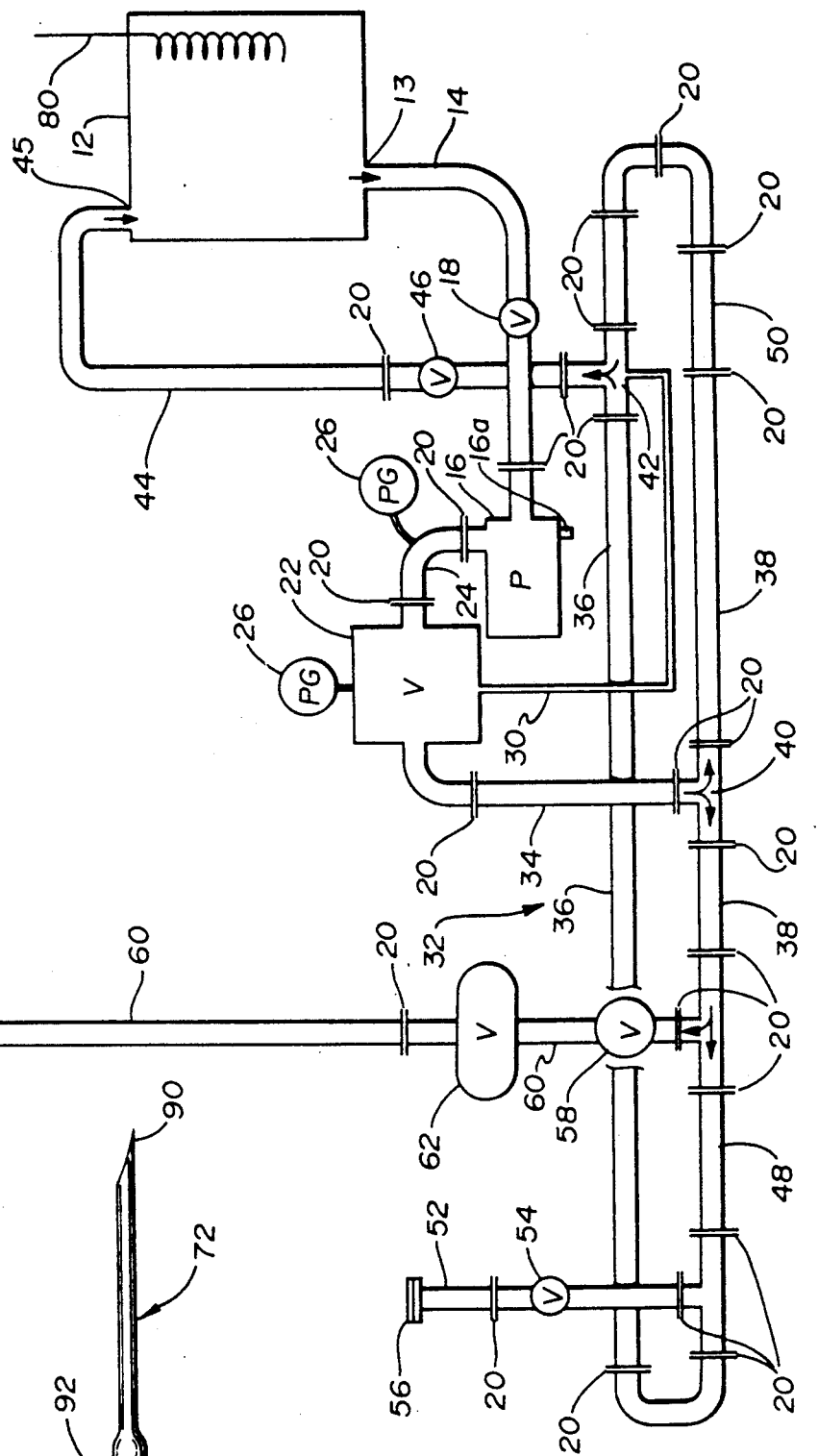
FIG. 1 is a schematic showing of the solution handling apparatus of the invention with direction of flow indicated by the arrows.

Preferably to FIG. 1, the solution handling section of the apparatus is shown in schematic for simplicity of understanding. It includes a stainless steel storage container means or tank 12 for holding treatment solution. Tank 12 may be of varying size and shape. A preferred tank is one of about 170 gallon volume, 16 gauge about 38 inches×35 inches and 54 inches having a piano-hinged top (not shown) as provided by Process Equipment Corporation of Belding, Mich. 48809. Attached to the outlet 13 of the tank is a first conduit means, preferably in the form of a 1½ inch conduit arrangement 14 and which may include stainless steel elbows and vinyl food handling tubing as necessary, for carrying treatment solution from tank 12 to a pump 16 or other suitable means for creating a flow of solution in the apparatus. A manual valve 18 may be included in this section of the conduit line. It may, for example be a Cooper Manufacturing ball valve Model #4151 SE 316 3-PC. A Thomsen clamp 20 may be used to attach conduit 14 to pump 16. A typical clamp for this purpose is a T-13, double screw, wing nut clamp which includes a silicon or Teflon gasket. Such clamps may be used throughout the apparatus as indicated by legend 20 throughout. In order to make use of standard parts, conduit 14 may be reduced in diameter from 1½ inches to 1¼ inches at some point between coupling 20 and valve 18 to adapt conduit size to standard intake line size of the pump. Pump 16 in turn conducts treatment solution to automatic valve 22 via a second conduit means in the form of a conduit line 24 which is 1 inch in diameter as is the remaining conduit line associated with the apparatus up to the injection nozzle. Again, this reduction in size is to accommodate standard parts, the pump output being 1 inch in diameter. Pump 16 is preferably an electrically operated pump, more preferably of the centrifugal type such as the FST-3000, Model 35 Stainless Steel Centrifugal Pump (close coupled) as provided by the Bell & Gossett Fluid Handling Division of ITT Corporation. A pressure gauge 26 may be included in line 24 for monitoring purposes. This valve may typically be of the stainless steel pressure valve type #WI 233.50 provided by WIKA of Hauppauge, New York with a 2½ inch dial.

Automatic control valve 22 is of the type which is designed to control downstream pressure to a steady value regardless of changing flow rate and/or varying inlet pressure. One such valve capable of accomplishing this is the type available from the Cla-Val Co. of Newport Beach, Calif., as Model 90-01 Series (90G-01 ABSKG). It is a pressure reducing valve which consists of a main valve and a pilot control system including a pressure reducing valve (not shown) (model CRD) and a pressure sensing line or feedback conduit 30.

The location of the open end of pressure sensing line 30 is critical to the operation of the apparatus. For proper control functioning of valve 22, the end of line 30 can only be located at the "T" intersection where recirculation line 44 meets header line 36, as shown is an example of such an arrangement.

When the end of line 30 is located elsewhere problems occur. With only one line operating in a multiline apparatus, extreme cavitation of valve 22 and extreme pressure fluctuations occur. In subsequent use, additional lines have been found to exhibit erratic pressure fluctuations as well. Also, the response time of valve 28 increases to unacceptable levels in excess of 5 seconds.

The ultimate result of such malfunctions is that definite variations occur in the amounts of solution injected through the lines and into animals.

Treatment solution is conducted from pump 16 through valve 22 to a header means generally indicated at 32 via a third conduit means in the form of conduit line 34. Header 32 is preferably comprised of paired conduit means 36 and 38, preferably, having a common inlet 40 and having a common outlet 42, between which the flow of treatment solution exiting from conduit 34 branches into two directions in header 32 to meet at common outlet 42. One branch or more than two branches may also be used. The flow of treatment solution meeting at common outlet 42 recirculates to storage container 12 via fourth conduit means in the form of a recirculation or conduit line 44 extending to the inlet 45 of container 12. Line 44 may contain a manual valve 46 which may be a Worcester ball valve product #WOC 5866R-SE. Manual valves 18 and 46 are placed in lines 14 and 44, respectively to accommodate replacement of tank 12. In operation, multiple tanks will be used. When one tank empties, valves 18 and 46 are closed and the apparatus is disconnected and reconnected to a fresh tank. The valves are opened and processing is continued. The empty tank may then be recharged with treatment solution for subsequent use.

As indicated above and in accordance with this invention it has been discovered that locating pressure sensor 30 for automatic valve 22 proximate the common outlet 42 of header 32, where the branched flow of solution meets, enables the valve to maintain the pressure in the header means and in all dispensing conduit means attached thereto, such as the means generally designated 60, at a steady value whether there is only one dispensing conduit or a plurality of them in use and attached to header means. Preferably, additional dispensing conduit lines (not shown) will be included as at 48 and 50. Most preferably, four such lines will be included in the apparatus although only one is shown for simplicity of description. Also, a drain line 52 with valve 54 and cap 56 may be included in header means 32. A drain 16a (normally closed) may also be included in the bottom of pump 16.

Referring now to dispensing conduit means 60, of which only one is shown, it is connected into header means 32 (36). Flow into conduit means 60 may be controlled by means of a valve 58 which is preferably of the same type as valve 54 in drain line 52, i.e., a manual butterfly valve. Conduit line 60 also includes a normally closed electrically operated valve 62 which is computer controlled as described further hereinbelow. Valve 62 may for example be a stainless steel electric ball valve of the type manufactured by Jamesbury of Worcester Mass., Model A, Type 1"21-3600TT3 which is solenoid operated. Conduit means 60 may also include a pressure valve 26, a flow meter 64, a manual valve 66, a check valve 68 and a manual ball valve 70 to which an injection nozzle 72 is connected (best seen in detail in FIG. 2). In practice, valve 66 is initially adjusted to a predetermined flow rate which is read on flowmeter 64 at which time the overall system is considered adjusted.

Valve 66 is then left set more or less permanently. Flow meter 64 may be of the turbine type supplied by Halliburton Services, Special Products Division, Duncan Okla. as part #458.8001. Valve 66 may be of the same type described at 46 hereinabove in line 44. Valve 70 may be of the stainless steel ball type manufactured by Crane Ordway Corporation under the trademark CAPRI and identified as part #2000 CWP CF 8M. The section 74 of dispensing conduit means 46 will preferably consist of a convenient length of vinyl food handling tubing such as that available from Mayon Plastics of Hopkins, Minn. 55343. A clamp arrangement (not shown) may be attached to the nozzle or upstream of it to hold the nozzle in position in the animal and force the operator for other duties. Any suitable clamp e.g., an alligator clamp or the like, may be used for this purpose.

Figure 2:
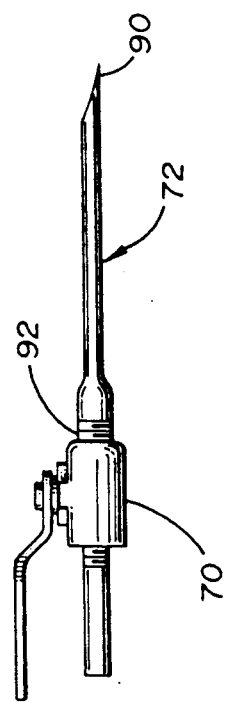
FIG. 2 is a detailed view of the self-piercing injection nozzle of the invention.

Referring now to FIG. 2, a detailed showing of the hollow injection nozzle 72 is provided. It includes a self-piercing tip 90 and is threaded at 92 to be fitted into valve 70. Nozzle 72 functions as a conduit for the treatment solution.

The apparatus will also preferably include a solution cooling arrangement such as means 80 in container 12 for cooling the solution therein. The arrangement shown in FIG. 1 is schematic and 80 is intended to indicate a cooling coil and associated operational means such as condenser and refrigerant, as are well known. Any arrangement may be used. One such arrangement may include (not shown) a copper coil wrapped around tank 12 on the outside and bottom with insulation covering the coil similar to the hot water heater jacket used for energy conservation. A condenser may be connected to the coil and the system then charged with a refrigerant such as R-22. Such an arrangement will adequately cool the treatment solution.

Preferably, the apparatus is normally operated by two people. One person handles the injection nozzle which has been pre-set as described above with all valves "open" except for electrical valve 62. This person inserts the nozzle into the animal and signals a second person at the computer who is responsible for entering data appropriate to the animal to be treated. This is described more fully hereinbelow. Upon being signaled, the computer operator presses a "start" button and the computer controls the injection treatment by program as will now be described.

Referring now to the computer control section of the apparatus, reference should be made to FIG. 3 which is a block diagram of the various components of the apparatus used in the treatment of slaughtered animals. A computer 100 is run by a program 104. A modem 102 may be connected to the computer for transferring data over a phone line and for remote control of the site computer. The preferred program for remote communications and control is PCNX made by Wendin. Electronic control means 106 is interfaced with the computer and in turn controls the opening and closing of electronic valves 112. "Open" control lines 108 and "closed" control lines 110 are included to operate the normally closed valves 112 (which correspond to valve 62 in FIG. 1). Note in FIG. 3 that there are four such valves corresponding to four dispensing conduit lines, one such line being identified in FIG. 1 at 60. Electronic control means 106 opens the electronic valves 112 by placing a 110 volt potential across selected "open" control lines 108 while holding the "closed" control lines 110 at 0 volts. In order to close the electronic valves, the "closed" control lines 110 are held at 110 volts while the "open" control lines 108 are held at 0 volts. Electronic valves 112 control the flow of solution through the dispensing conduit lines 114 (which correspond to 60 in FIG. 1). The solution is contained within the solution handling section 116 already described above with reference to FIGS. 1 and 2.

FIG. 4 shows a block diagram of computer 100 from FIG. 3. The block diagram shows a generic microprocessor for computer 100. Any computer may be used. However, a microcomputer is the most economical. Generic microcomputer 100 is made up of a variety of components attached to the system bus 101 as shown. The central processing unit (CPU) 118 runs the entire system. A read only memory (ROM) 124 contains the low level routine, i.e., basic input/output routines. A random access memory (RAM) 126 is used to store the operating systems and the actively running programs, along with data. The clock 128 is used to synchronize all of the operations which take place along system bus 101. A cathode ray tube (CRT) display 122 is connected to the system bus by means of CRT controller 120. A keyboard for operator input and control 134 is connected to the system bus by means of keyboard interface 132. Function keys 136 are used as control keys in the preferred embodiment. A direct memory access controller (DMA) 138 is used to control the movement of data and programs from the magnetic disk storage unit 142 connected to the system bus by interface 140, to RAM unit 126. The DMA 138 controls this operation without using CPU 118, thus freeing up the CPU for more important tasks. Electronic control means 106 is connected with the system bus as well.

Referring to FIG. 5, the main menu display of program 104 is shown. The overall program is made up of several subprograms identified herein by Appendices I-VII, I-VI being written in C language while VII is written in assembly language. Appendices VII and IX, X, XI, XII and XIII are included because they are referred to from time to time in various of the appendices I-VII. The main driving portion of the program, is shown in Appendix I (see below). The program shown in Appendix I is the program which calls all the other subprograms. The display of the box form of the menu is controlled by the program shown in Appendix II (see below).

The plant ID code is shown at 150. Header information 152 is also controlled by the program in Appendix II. The actual text of the menu is controlled by the program shown in Appendix III (see below).

If the operator chooses "P" indicated at 154 in FIG. 5, for example, control is passed from the program in Appendix I to the program shown in Appendix IV (see below) displaying the menu of FIG. 10. If "A" at 156 in FIG. 5 is chosen, control is passed from the program in Appendix I to the program shown in Appendix V (see below) displaying the menu of FIG. 6. If "F" as at 158 in FIG. 5 is selected by the operator, control is passed from the program in Appendix I to the program shown in Appendix VI (see below). It should be understood that the letters "P", "A", and "F" may be replaced by any number of designations, as long as control is passed from a main calling program such as the one shown in Appendix I to a subprogram such as the ones shown in Appendices IV-VII. Keyboard 134 is utilized by the operator to choose the options off the main menu.

Referring now to FIG. 6, the operator must identify themselves and enter the proper password to gain access to the menu shown in FIG. 7. The password insures that only authorized people may access the functions shown in FIG. 7. The menu in FIG. 7 is controlled by the program of Appendix III and is displayed when the program contained in Appendix V is called. The operator selects an option by means of keyboard 134. If the operator chooses "P" at, 170 in FIG. 7, these passwords can be changed or modified. There are three types of passwords: the administrative password, daily passwords and operator passwords. When "P" is chosen, the menu shown in FIG. 8 is displayed. If the operator chooses "S" shown at 172 in FIG. 7, then the menu shown in FIG. 9 is displayed. When the operator chooses "0" shown at 171 in FIG. 6, the authorized operators may be changed. If the operator chooses "C" shown at 176 in FIG. 7, the accounting files which contain information about the animals being processed are copied to a floppy diskette. If the operator chooses "E" shown at 178 in FIG. 7, control passes from the program of Appendix I back to the disk operating system.

Referring now to FIG. 8, the change password menu is displayed. The administrative password is shown at 180, the daily password is shown at 182 and the operator passwords are shown at 184. The dates at 184 show when the operator passwords expire. If all the operator passwords have expired and the operator needs to utilize the equipment, he can use the daily password 182 which is operable only for the day which it is set.

Referring now to FIG. 9, the "S" option "Change System Information" of FIG. 7 causes this menu to be displayed. The plant ID can be changed at 150. The program refers to the flow rate shown at 190 to perform its accounting calculations. If the flow rate of the solution handling section changes, the program can be informed by making a correction at 190. The number of valves (112 in FIG. 3) controlled by the program can be changed at 192. In the preferred embodiment this number can range from 1 to 4 although a greater number of valves may be controlled by the same program with minor modifications. The time it takes for a valve to open or close is shown at 194. The time is shown in units with one unit equal to 1/18th of a second. Lastly, the base address can be changed at 198, the base address controls where the computer addresses the circuit shown in FIG. 18.

Referring now to FIG. 5, when the operator chooses "F", a variety of accounting reports may be printed to an output device, either to the CRT or to a printer in the preferred embodiment.

Referring now to FIG. 10, the operators must identify themselves and enter a password to obtain access to the menu shown in FIG. 11. The menu shown in FIG. 12 is displayed in response to the selection of the "P" option in FIG. 11. If the number of valves is set to 4 in FIG. 9, then all four displays will be shown simultaneously. The operator selects a valve to operate by means of function keys 136 shown in FIG. 4. Function key F1 controls valve 1, function key F2 controls valve 2 and so on. It is to be understood that any variety of key control can be utilized in this context. Once the operator has chosen a valve to control, the border of the menu is highlighted to show the operator which screen to refer to and which valve is being controlled.

If the "R" option is chosen from FIG. 11, then all valves are opened for a period of time to clean the apparatus.

Figure 13:
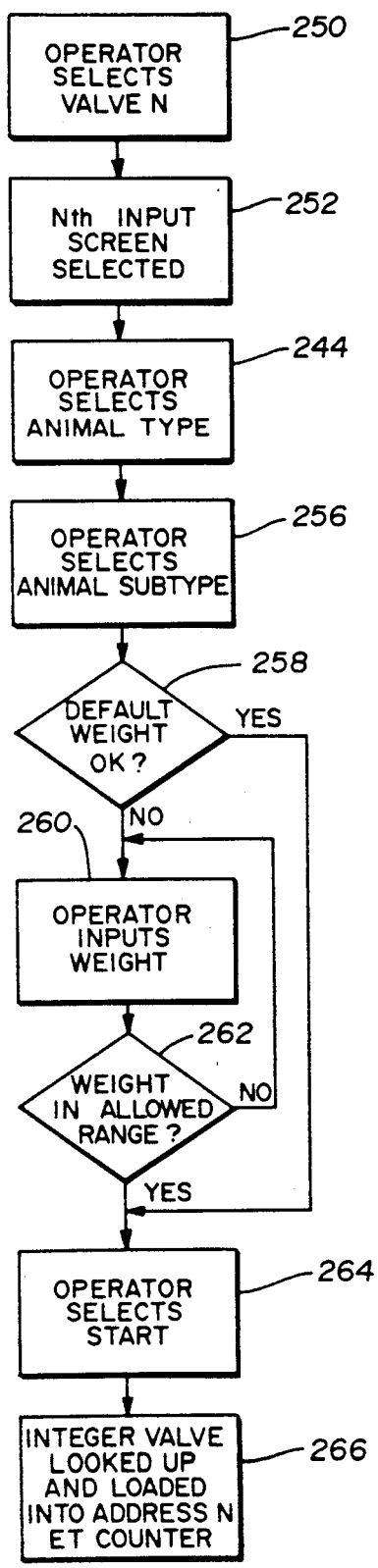
FIG. 13 is a flow chart of the steps included in selecting a valve to control and entering information.
Figure 14:
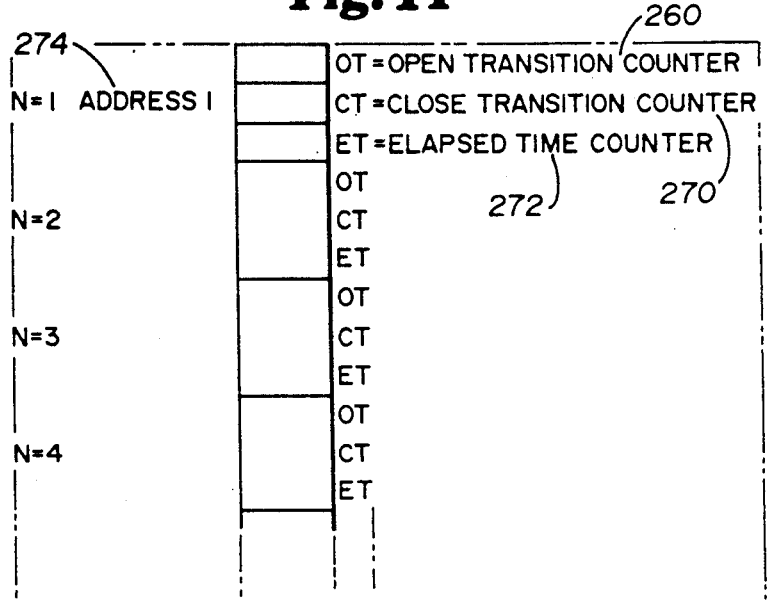
FIG. 14 is a schematic diagram showing three memory locations set aside as counters for each valve.

Referring now to FIG. 13, an information input flow chart is shown by means of which an operator inputs data to the program for operation of the apparatus. The program for the following flow chart is contained in Appendix IV. The operator selects a valve in block 250, where N represents the valve number the operator has selected. The input screen is then highlighted in block 252. The operator then selects, an animal type in block 244 by picking out one of the display choices in window 208 of FIG. 12. The operator then selects the animal subtype in block 256 by means of window 210 of FIG. 12. If the weight displayed for animal type and subtype is in correspondence with the type of animal to be treated, then the operator can open the appropriate valve by means of option "S" at 222 from the menu of FIG. 12. However, if the operator wishes to change the weight shown, he may do so with option "W" shown at 220 in FIG. 12. The operator inputs the weight in block 260 of FIG. 13, and in block 262 of FIG. 13 the weight is checked against a range of values which varies with each animal type to determine if it is within the allowable range. If the weight is within the allowable range, control is passed to block 264 of FIG. 13. However, if the weight is not within allowable range, the operator must rekey the weight. Whenever the operator is ready, he may select the "S" option "start" shown in FIG. 12 at 222 and as indicated in block 264 of FIG. 13. At block 266 of FIG. 13 an integer value which corresponds to the length of time the valve is to be open is located and selected in the memory and loaded into an address "N segment" (N=1, 2, 3, etc) of the ET elapsed time counter which is shown in FIG. 14. There are three counters for each valve: denoted OT, CT and ET, respectively as shown in FIG. 14.

Referring now specifically to FIG. 14, a diagram or memory map of these valve counters is shown. There are three memory locations set aside in the three counters associated with each valve. Valve 1 where N=1 is shown at 274. The other three valves operate the same way as valve 1. The three counters are the open transition counter (OT) shown at 268, the closed transition counter (CT) shown at 270, and the elapsed time counter (ET) shown at 272. The ET counter is initialized to O, while the OT and CT counters are initialized to the valve shown at 194 in FIG. 9.

Figure 15:
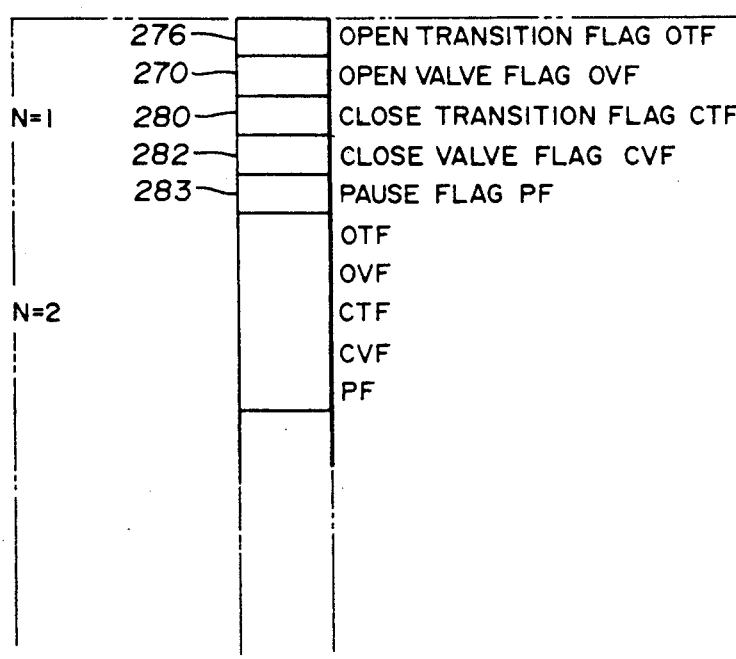
FIG. 15 is a schematic diagram showing memory locations set aside for various flags depicting the status of each valve.

Referring now to FIG. 15, a diagram or memory map of the flags utilized by the program is shown. The "open transition flag" (OTF) shown at 276 is set to TRUE whenever the valve with which it is associated is in the process of being opened. The "open valve flag" (OVF) shown at 278 is set to TRUE whenever the valve is opened. The "closed transition flag" (CTF) shown at 280 is set to TRUE whenever the valve is in the process of being closed. The closed valve flag (CVF) shown at 282 is set to TRUE whenever the valve is closed. These flags inform the program whether the valve is in the process of being opened or closed, which in the preferred embodiment is shown at 194 in FIG. 8. However, a variety of elapsed times for opening and closing may be used. The purpose of the transition flags is to prevent commands from being sent to a valve while the valve is in the process of being opened or closed.

Figure 16:
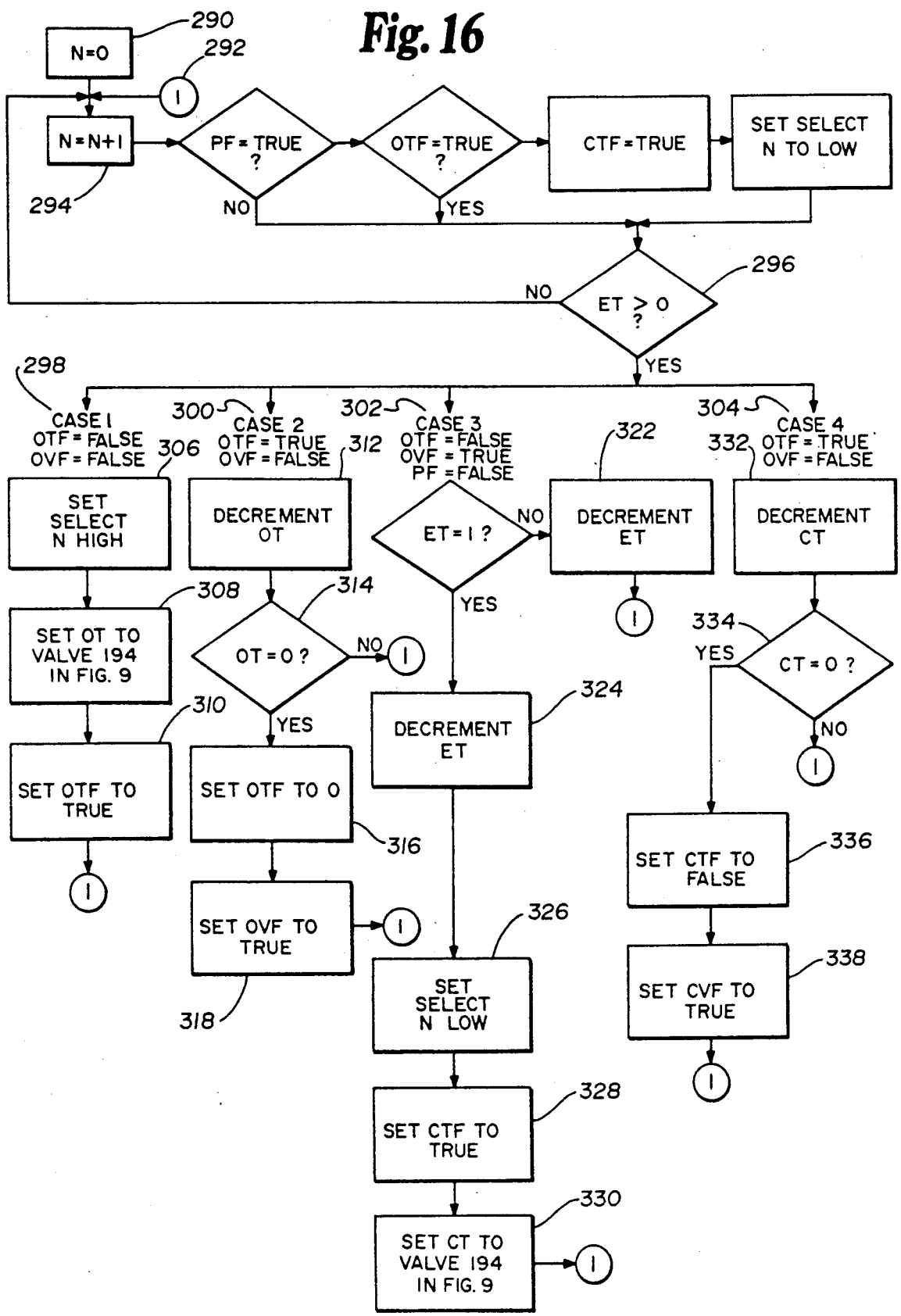
FIG. 16 is a flow chart showing the steps executed by the Interrupt program.

Referring now to FIG. 16, an interrupt program flow chart is shown. A "hardware interrupt" is generated by the computer 18.2 times per second. The assembly language program shown in Appendix VII is the interrupt program which corresponds to FIG. 16. This program is called and executed 18.2 times per second by the computer. FIG. 16 shows one interrupt cycle of this program. The program checks the status of all four valves before it returns control to the main program. At 290 a counter N, which corresponds to each valve is set to 0. A counter, used to increment N, is shown at 294. A conditional branch is shown at block 296. If the elapsed time counter of address N segment, where N can be 1-4, is greater than 0, then the program will move to test for the various cases shown at 298-304. However, if ET is equal to 0, the interrupt program perceives that valve N is closed and the computer loops back to the counter at 294. If the elapsed time (ET) counter is greater than 0, the various flags shown in FIG. 12 are checked. Case 1, shown at 298, represents the situation in which the OTF flag is set to FALSE and the OVF flag is also set to FALSE. In this case, the valve must be opened by the computer. The program sets the select N line (shown in FIG. 18) to a high voltage potential "high," which will start the process of opening the valve in block 306 of FIG. 16. The program then sets the OT counter to the value shown at 194 in FIG. 9 in block 308. 144 is equivalent to 8 seconds and may be varied depending on the length of time required to open or close a valve). The program then sets the OTF flag to TRUE in block 310 of FIG. 16 to inform the program that the valve is now in the transition phase of opening.

Control is then passed back to point 1 shown at 292 in FIG. 16 to increment the counter and check the next valve. Case 2 is shown at 300 with the OTF flag being set to TRUE and the OVF flag being set to FALSE. In this case the valve is in the process of being opened. The program will execute 144 times before the valve is finished opening. The OT counter is decremented by one integer value in block 312 of FIG. 16. In block 314 of the Figure a conditional branch is shown where, if the OT counter equals 0, the program sets the OTF flag to FALSE in block 316, signifying that the valve is no longer in the transitional phase. The OVF flag is then set to TRUE in block 318, signifying that the valve is now open. If the OT counter is not equal to 0 in conditional branch 314, then the program perceives that the valve is still, in the process of being opened. At this point control is then passed back to 292 in FIG. 16 where the counter is incremented and checks the next valve.

Case 3 is shown at 302 in which where the OTF flag is set to FALSE, the OVF flag is TRUE and the pause flag (PF) is FALSE. In this case the valve is open. The valve is kept open for a time which is the substantial equivalent to the integer value stored in the ET counter. The program checks to determine whether the ET counter is equal to 1 in conditional branch 320 of FIG. 13. If it is not equal to 1, then the ET counter is decremented in block 322 and control passes to point 292. However, if the ET counter is equal to 1, the program realizes it must initiate the "close valve process." Therefore, it decrements the ET counter to 0 in block 324, sets the select N line to "low" which initiates the "close valve signal" in block 326, sets the CTF flag to TRUE in block 328 (which informs the program that the valve is in the closed transition phase), and sets the CT counter to the value shown at 194 in FIG. 9 in block 330. Control is then passed to point 1 shown at 292.

Case 4 is shown at 304, with CTF set to TRUE and CVF set to FALSE. In this case the valve is in the "close transition phase". The CT counter is decremented in block 332 of FIG. 16, then checked to determine if the CT counter is equal to 0 in conditional branch 334. If it is not equal to 0, control is passed to point 1 at 292. However, if it is equal to 0, the program perceives that the valve is closed and, therefore, sets the CTF flag to FALSE in block 336 and sets the CVF flag to TRUE in block 338. Control is then passed back to point 1 at 292. Complete cycling of N=14 occurs 18.2 times per second. This corresponds to checking the condition of each valve.

Figure 17:
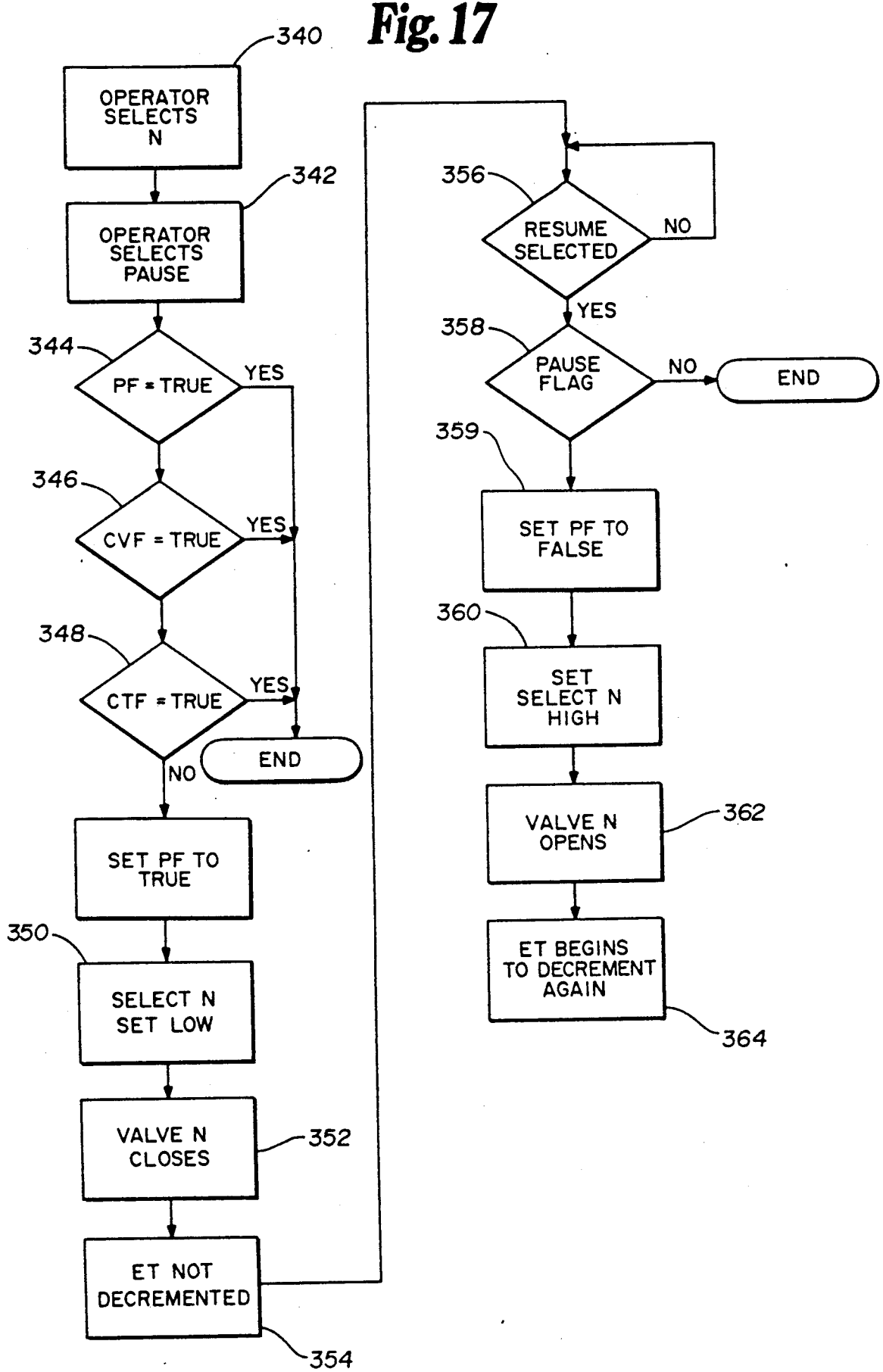
FIG. 17 is a flow chart showing the steps executed by the Pause program.

Referring now to FIG. 17, the Pause Program Flow Chart is shown. While the valve is open, the operator may wish to halt the flow of solution to take care of some problem. The pause program allows a valve to be closed for a period of time while preventing the ET counter from being decremented, so that upon reopening the valve the previously determined remaining amount of solution may be injected into the animal. By selecting the valve to control by means of the function keys F1 through F4 in the preferred embodiment, the operator can gain access to the input screen of FIG. 12 which controls the particular valve in question shown at block 340 in FIG. 17. The operator then selects the "P" option from the menu shown in FIG. 12, also shown in block 342 of FIG. 17. In blocks 344 through block 348 of FIG. 17, the program checks to determine if the valve is paused, being closed or in a closed state. If any one of these conditions exists, the pause program ends. A closed valve may not be paused, and a valve that is paused, closed, or in a closed transition phase may not be paused. If the valve is open or opening, control passes to block 349 whom the pause flag is set to true. Then control then passes to block 350 in which the select N line is set "low" which causes the valve to close at block 352. The elapsed time counter is then prevented from being decremented at block 354. The valve remains closed until the operator selects "resume" from the menu in FIG. 12, controlled by conditional branch 356. Once "resume" is selected, the program determines whether the pause flag, shown at 283 in FIG. 15, has been set to TRUE by means of conditional branch 358. If the pause flag has not been set to TRUE, then the "resume" is ignored and the program ends. If the pause flag is TRUE then the pause flag is set to FALSE and the valve begins to open, controlled by blocks 360 and 362. The elapsed time counter begins to decrement again at block 364.

A modification of the pause program shown in FIG. 17 may be used to "pause" all open valves simultaneously and "resume" all paused valves with these two functions being assigned special function keys.

Figure 18:
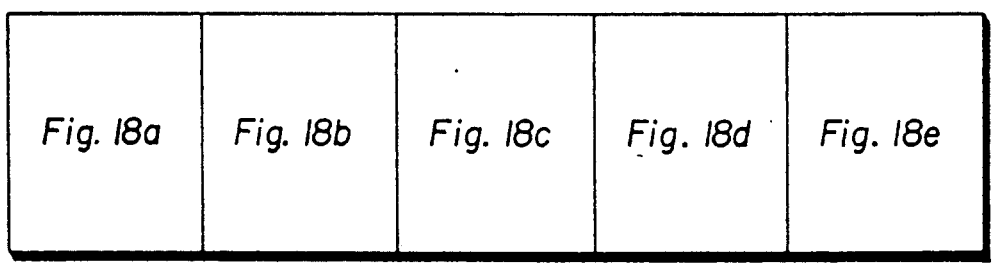
FIG. 18 is an organizational diagram for a schematic circuit diagram made up of multiple FIGS. 18a–18e and is a circuit diagram showing an embodiment of the electronic control means of FIG. 3.
Figure 18A:
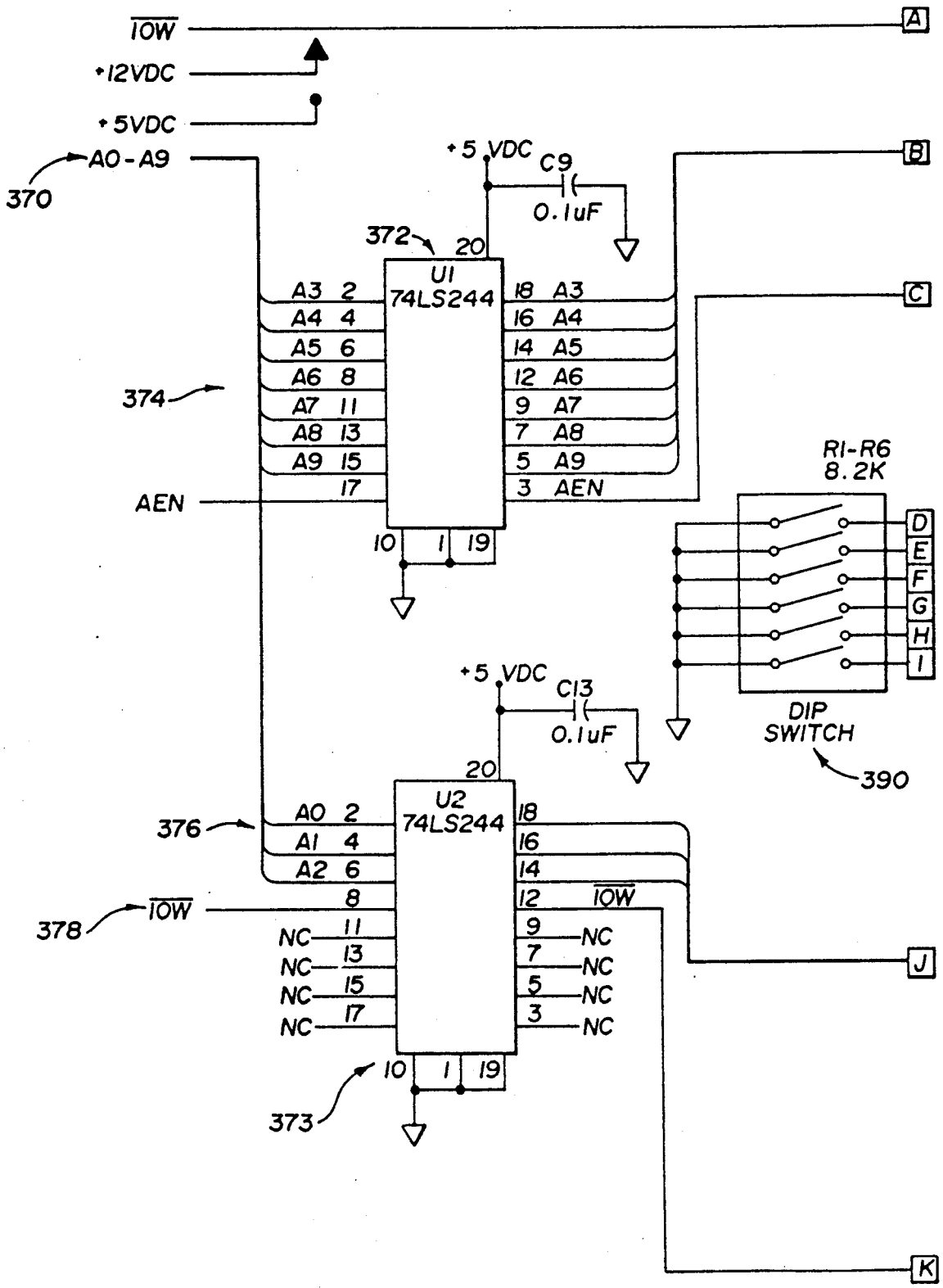
Figure 18B:
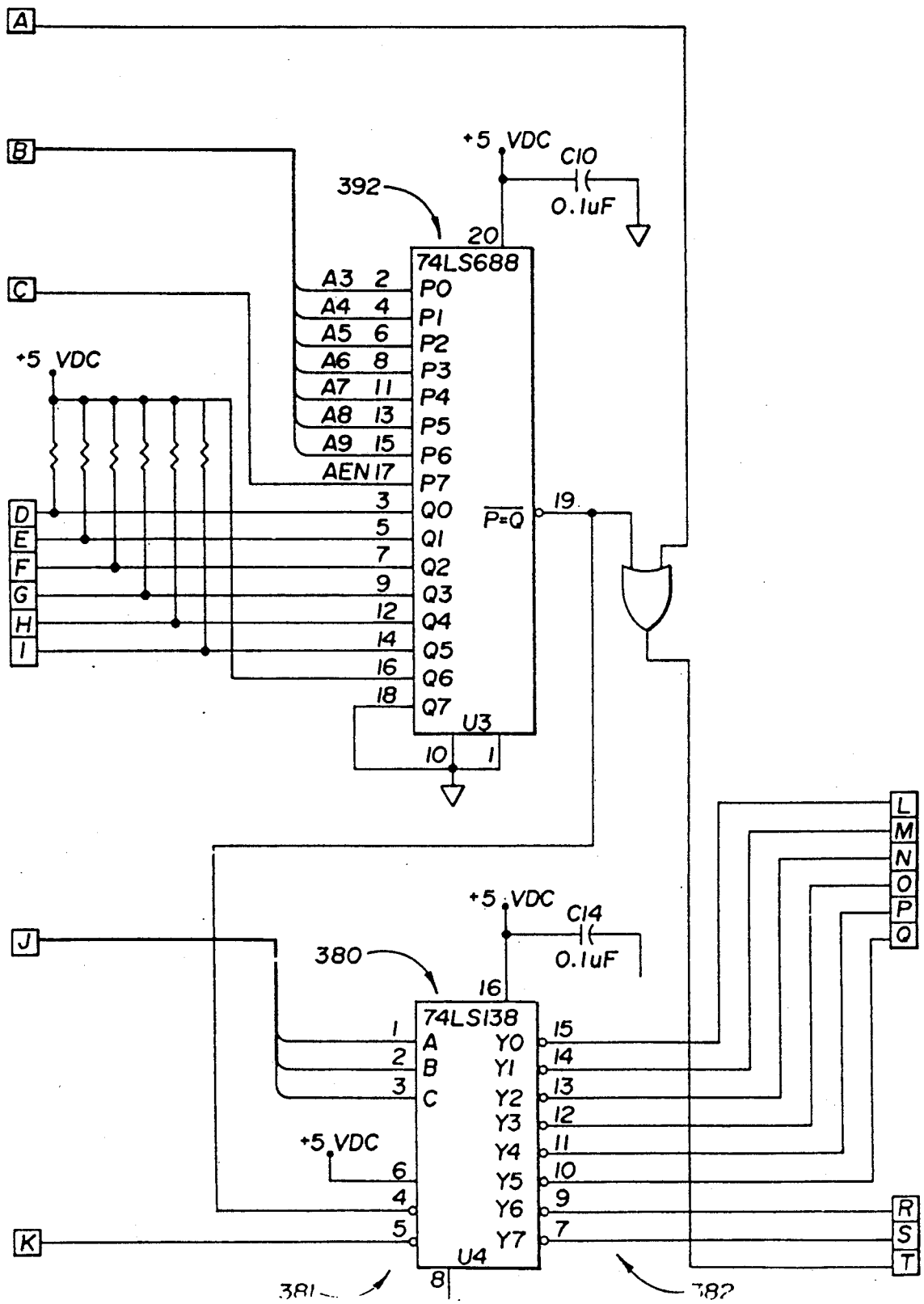
Figure 18C:
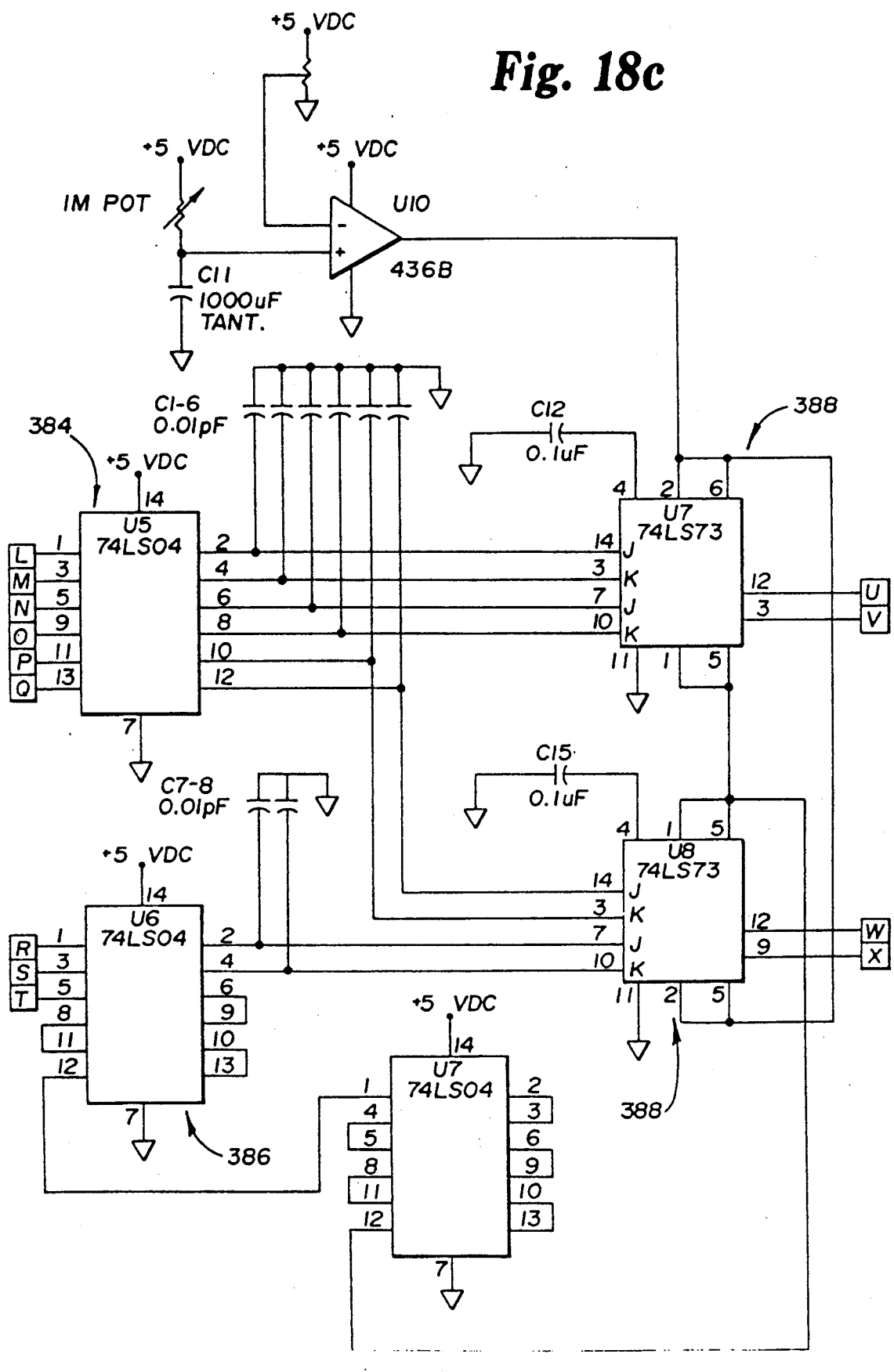
Figure 18D:
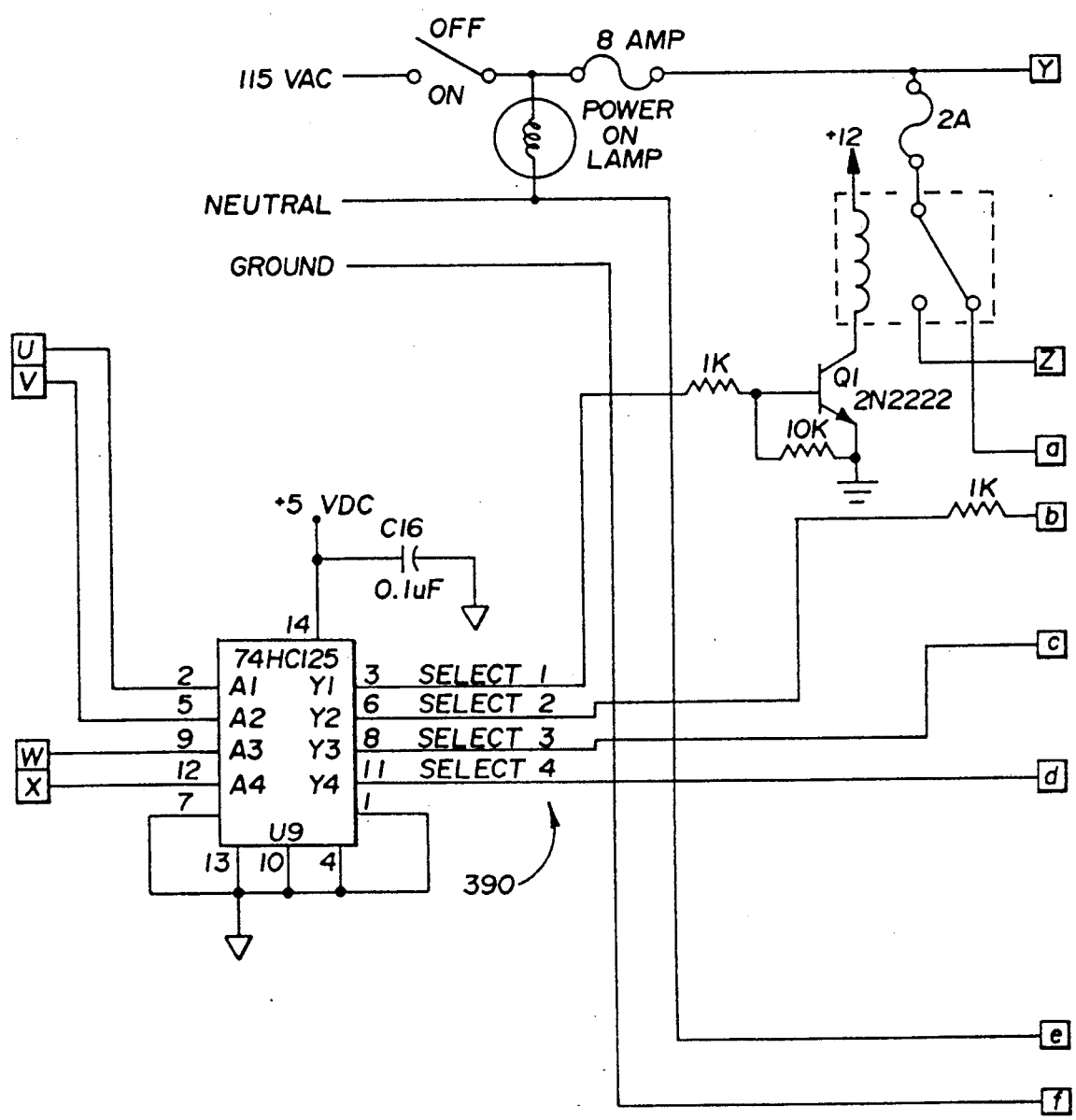
Figure 18E:
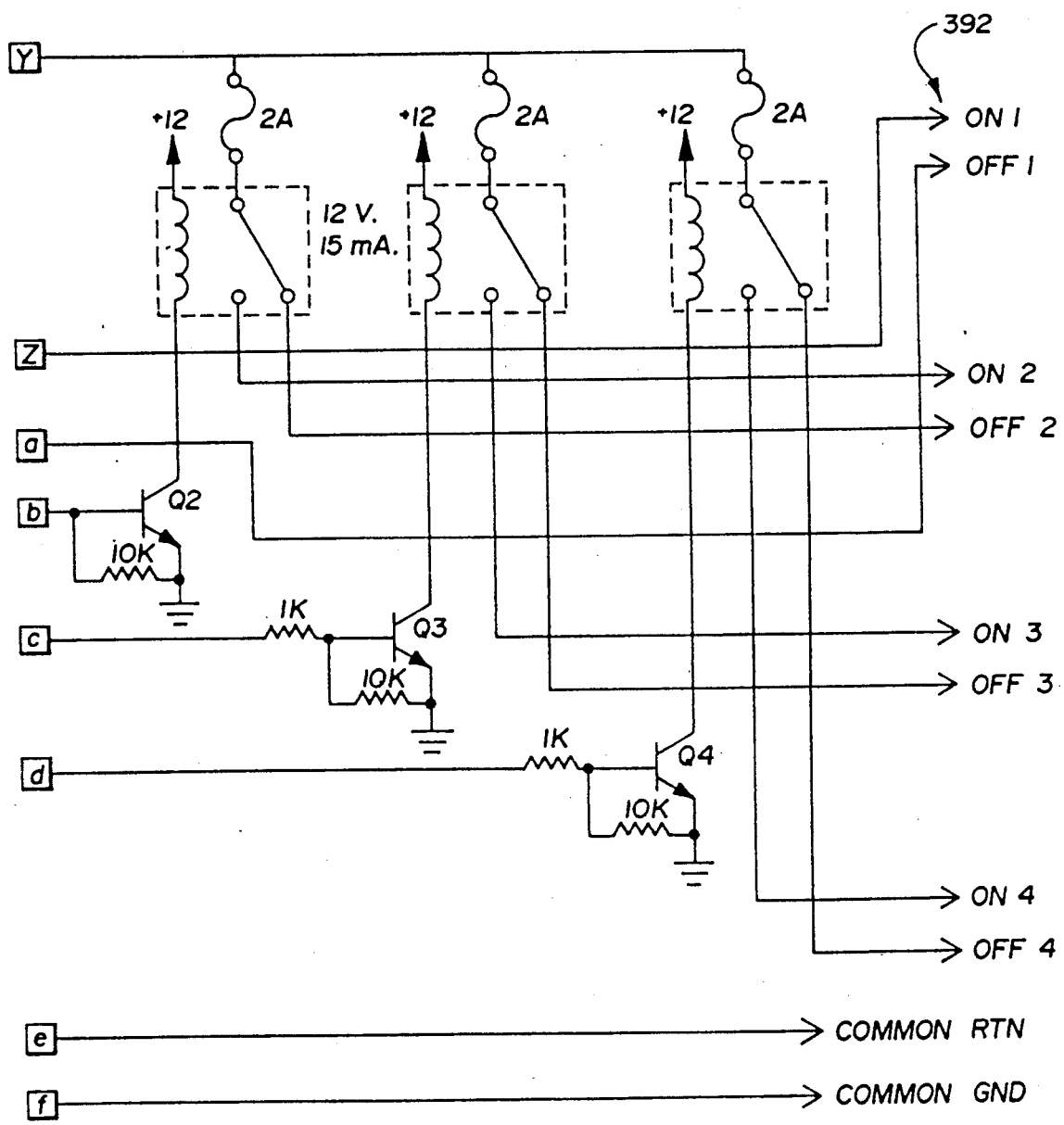

Referring now to FIG. 18, a circuit diagram of electronic control means 106 of FIG. 3 is shown. The purpose of this circuit is to provide four sets of on/off lines. One set for each valve. Many circuit arrangements may be substituted for the one disclosed. Address lines A0–A9 shown at 370 are split, A3–A9 going to buffer 372, and A0–A2 going to buffer 373.

Address lines A0–A9 are checked by comparator 392 against the preset dip switches 390. If the address is valid and the CPU is in a low state (IOW at 378 is low), then the JK flip flops 388 are enabled.

A0–A2 are decoded at 381 resulting in eight lines or four sets of on/off control lines. The eight control lines shown at 382 are buffered at 384 and 386 before being passed to the JK flip flops. Ultimately the four select lines shown at 390 are produced. If for example select 1 goes high, the ON 1 line (also 108 in FIG. 3) is held at zero volts and the "OFF 1 line" (also 110 in FIG. 3) is held at 110 volts (shown generally at 392) thereby closing the valve controlled by the select 1 line. If select 1 goes low the opposite takes place and the valve is opened.

Additional embodiments of the invention will occur to others. The scope of the invention is to be limited only by the appended claims. Accordingly, reference should be had to the following claims in determining the scope of the invention.

PROGRAM APPENDICES

PATENT APPLICATION

OF: Douglas H. Bernhardt
    Guillermo R. Matheu
    Spencer E. Crum
    John T. Adelmann

FOR: APPARATUS FOR TREATING SLAUGHTERED ANIMALS.

©COPYRIGHT 1987
Meat Processing Service Corp. Inc.
ALL RIGHTS RESERVED

APPENDIX I.

```
~cow.c
include <sub.h> struct menurecord
menudata;                   /* Used for keeping the menu data
*/
struct operrecord oper[6];            /* Used for
keeping the operator  */
int opnum;
struct pwrecord pw[6];                /* Used for
keeping the passwords */
int pwnum;
struct systemrecord sysinfo;          /* Used for
keeping the plant ID  */
struct typerecord *typedat;           /* Used for
keeping the type table*/
int typenum;
struct cumrecord cum;                 /* Used for the
```

```
CUM file */
char filcum[16];
struct dlyrecord dly;              /* Used for the
DLY file */
char fildly[16];

main()
{
  register  i;
  void   menu1(),
         menu2(),
         menu3(),
         control_c();

struct menurecord *readmenu();
  struct typerecord *readtype();

scr_echo(TRUE);
  menudata = readmenu();              /* Set up menu
and return pointer */
  readtype();                         /* Set up types
and return pointer */
  readsysinfo();                      /* Load Sysinfo
File   */
  readlog();                          /* Load Log
File      */
#ifdef HD
  strcpy(filcum, "PLT");
  strcat(filcum, sysinfo.id);
  strcat(filcum, ".CUM");
  strcpy(fildly, "PLT");
  strcat(fildly, sysinfo.id);
  strcat(fildly, ".DLY");
#else
  strcpy(filcum, "A:PLT");
  strcat(filcum, sysinfo.id);
  strcat(filcum, ".CUM");
  strcpy(fildly, "B:PLT");
```

```
   strcat(fildly, sysinfo.id);
   strcat(fildly, ".DLY");
endif for(;;)
      switch(menu(0, menudata))
      {
         case 'P':      /* Process Function Mneu */
            menu1();
            break;

case 'F':      /* File Printout Menu */
            menu2();
            break;

case 'A':      /* Administration Menu */
            menu3();
            break;

#ifdef HD
         case ESC:      /* Exit Program If Debug */
            scr_clear();
            exit();
#endif
      }
} void
menu1()
{
   void process();
   char enterpw();

if (enterpw("Process Control Menu Password", TRUE) ==
FALSE)
      return;
   login();
```

```
    for(;;)
      switch(menu(1, menudata))
      {
        case 'P':       /* Process Control */
          process();
          break;

case 'R':       /* Recirculation Control */
          flush();
          break;

case ESC:
          logout();
          writelog();
          return;
      }
} void
menu2()
{
  for(;;)
    switch(menu(2, menudata))
    {
      case 'C':       /* Print Cum file */
        printcum();
        break;

case 'D':       /* Print Dly file */
        printdly();
        break;

case 'L':       /* Print Log file */
        printlog();
        break;

case ESC:
        return;
```

```
    }
} void
menu3()
{
  char enterpw();

if (enterpw("Administration Menu Password", FALSE) ==
FALSE)
     return;

for(;;)
     switch(menu(3, menudata))
     {
       case 'P':                                    /* Change
Passwords Function */
          changepw();
          break;

case 'S':                                    /* Change
System information */
          changeid();
          break;

case 'O':                                    /* Change
Operator Function */
          changeop();
          break;

case 'C':                                    /* Copy
Cum & Dly files*/
          copyfiles();
          break;

case 'E':                                    /* Exit
To DOS Function*/
          scr_clear();
```

```
        scr_puts("Good Bye");
        scr_puts(" and have a Nice Day");
        exit();

case ESC:
        return;
    }
} void
beep()
{
  sound(500, 15);
} char
enterpw(str, pw_type)
char *str;
int pw_type;
{
  register  i,
            flg;
  char  buf[18],
        msg[64],
        *asc_date(),
        c;

long  get_time_date();

header(str);
  scr_echo(FALSE);
  box(21, 8, 57, 19, FALSE);
  box(24, 9, 54, 18, FALSE);

scr_curs(12, 27);
  scr_puts("Operator ");
  scr_curs(12, 36);
  reverse();
```

```
scr_puts("                   ");
normal();
scr_curs(15, 27);
scr_puts("Password ");
reverse();
scr_curs(15, 36);
scr_puts("                   ");

buf[0] = '\0';
for(i = 0; i != 16; ++i)
{
   scr_curs(12, 36 + i);
   c = getkey();
   if (c == ESC)
   {
      normal();
      return(FALSE);
   }
   if (c == '\r' || c == '\t')
      break;
   if (c == '\b')
   {
      if (i != 0)
      {
         i-=1;
         scr_curs(12, 36 + i);
         scr_putc(' ');
         scr_curs(12, 36 + i);
         i-=1;
      }
   }
   else
   {
      buf[i] = toupper(c);
      scr_putc(toupper(c));
   }
}
buf[i] = '\0';
```

```
normal();
for(i = 0, flg = FALSE; i != 6 && flg == FALSE; i++)
   if (!strcmp(oper[i].name, buf))
      flg = TRUE;
i -= 1;
if (!flg)
{
   center(22, 39, "Operator is not a valid one.");
   hit_any_key(TRUE);
   scr_echo(TRUE);
   return(flg);
}
opnum = i;

buf[0] = '\0';
reverse();

for(i = 0; i != 16; ++i)
{
   scr_curs(15, 36 + i);
   c = getkey();
   if (c == ESC)
   {
      normal();
      scr_echo(TRUE);
      return(FALSE);
   }
   if (c == '\r')
      break;
   if (c == '\b')
   {
      if (i != 0)
      {
         i-=1;
         scr_curs(15, 36 + i);
         scr_putc(' ');
         scr_curs(15, 36 + i);
         i-=1;
      }
```

```
      }
    else
    {
       buf[i] = c;
       scr_putc('X');
    }
  }
  buf[i] = '\0';
  normal();
  if (!strcmp("ellis", buf) && !pw_type)
    return(TRUE);
  for(i = 0, flg = FALSE; i != 6 && flg == FALSE; i++)
    if (!strcmp(pw[i].title, buf))
        flg = TRUE;
    i -= 1;

if (!flg)
    {
      center(22, 39, "Your password is not a valid one");
      hit_any_key(TRUE);
      scr_echo(TRUE);
      return(flg);
    } switch(pw_type)
    {
      case 0:                                           /* check for admin. PW */
        if (i == 0)
           return(TRUE);
        else
        {
           center(22, 39, "Your password is not a valid one.");
           flg = FALSE;
        }
        break;
```

```c
      case 1:                                         /* check for process PW's */
        switch (i)
        {
          case 0:                                     /* check for admin. PW */
            center(22, 39, "Your password is not a valid one.");
            flg = FALSE;
            break;

case 1:                                     /* check for daily PW */
            if (!pw[1].date.unpack.month)
            {
              get_time_date(&pw[1].date);
              writesysinfo();
            } case 2:                                     /* check for normal PW */
          case 3:
          case 4:
          case 5:
            if (pw[i].date.pack >= get_time_date(NULL))
            {
              sprintf(msg,"Password is good through %s.",asc_date(&pw[i].date));
              center(22, 39, msg);
              flg = TRUE;
            }
            else
            {
              sprintf(msg,"Password is expired as of %s.",asc_date(&pw[i].date));
              center(22, 39, msg);
              flg = FALSE;
            }
            pwnum = i;
```

```
        break;
    }
    break;
}
hit_any_key(TRUE);
scr_echo(TRUE);
  return(flg);
} hit_any_key(flg)
int flg;
{
   center(24, 39, "Hit Any Key To Continue.");
   if (flg)
     return(getkey());
   else
     return(scr_getc());
}
```

APPENDIX II

```
~box.c
include <sub.h> void
box(x1cor, y1cor, x2cor, y2cor, type)
int x1cor, y1cor, x2cor, y2cor, type;
{
   register i;

for(i=y1cor + 1; i!=y2cor; i++)
   {
     scr_curs(i,x1cor);
     scr_putc(type ? 186: 179);
     scr_curs(i,x2cor);
     scr_putc(type ? 186: 179);
   }
   for(i=x1cor + 1; i!=x2cor; i++)
```

```c
    {
      scr_curs(y1cor,i);
      scr_putc(type ? 205: 196);
      scr_curs(y2cor,i);
      scr_putc(type ? 205: 196);
    }
  scr_curs(y1cor,x1cor);
  scr_putc(type ? 201: 218);
  scr_curs(y1cor,x2cor);
  scr_putc(type ? 187: 191);
  scr_curs(y2cor,x1cor);
  scr_putc(type ? 200: 192);
  scr_curs(y2cor,x2cor);
  scr_putc(type ? 188: 217);
} void
hline(xcor, ycor, len, type)
int xcor, ycor, len, type;
{
  register int i;

for(i=xcor; i!=xcor+len; i++)
  {
    scr_curs(ycor,i);
    scr_putc(type ? 205:196);
  }
} void
vline(xcor, ycor, len, type)
int xcor, ycor, len, type;
{
  register int i;

for(i = ycor; i != ycor + len; i++)
  {
    scr_curs(i, xcor);
```

```
      scr_putc(type ? 186: 179);
   }
} void
center(ycor, cen, str)
int ycor, cen;
char *str;
{
   register i;

i = strlen(str);
   scr_curs(ycor, cen - i / 2);
   scr_printf("%s", str);
} void
cur(cursor)
int cursor;
{
   if (cursor)
      if (peekb(0x449, 0x0) == MONO)
         scr_call(0x0100, 0x0, 0x0c0d, 0x0);
      else
         scr_call(0x0100, 0x0, 0x0607, 0x0);
   else
         scr_call(0x0100, 0x0, 0x2000, 0x0);
} int *
getbox(x1cor, y1cor, x2cor, y2cor)
int x1cor, y1cor, x2cor, y2cor;
{
   register  i,
             j;
   int *p,
       *buf,
       *malloc();
```

```
  p = buf = malloc((y2cor - y1cor + 1) * (x2cor - x1cor
+ 1) * sizeof(int));
  for (i = y1cor; i <= y2cor; i++)
    for (j = x1cor; j <= x2cor; j++)
    {
      scr_curs(i, j);
      *p++ = scr_call(0x0800, 0, 0, 0);
    }
  return (buf);
}
void
putbox(x1cor, y1cor, x2cor, y2cor, buf)
int y1cor, x1cor, y2cor, x2cor, *buf;
{
  register i,
           j;
  int *p;

p = buf;
  for (i = y1cor; i <= y2cor; i++)
    for (j = x1cor; j <= x2cor; j++)
    {
      scr_curs(i, j);
      scr_call(*p & 0xff | 0x0900, *p >> 8, 1, 0);
      p++;
    }
  free(buf);
}
```

APPENDIX III

```
~menu.c
#include <sub.h>
include <extern.h> menu(num, mdat)
int num;
struct menurecord *mdat;
```

```c
{
  void  box(),
        header();

register  i,
            j,
            ycor;

register char c,
                value;

scr_echo(1);
  header(mdat[num].header);

ycor = mdat[num].step * mdat[num].etnum + mdat[num].ycor;
  for(i = 0; i != mdat[num].etnum; i++)
  {
    scr_curs(mdat[num].step * i + mdat[num].ycor, mdat[num].xcor);
    scr_printf("%c) %s",mdat[num].entry[i].selc, mdat[num].entry[i].title);
  }
  for(;;)
  {
    scr_curs(ycor, mdat[num].xcor);
    scr_puts("                         ");
    for(j = TRUE; j == TRUE; )
    {
      scr_curs(ycor, mdat[num].xcor);
      scr_puts("Which:  ");
      scr_curs(ycor, mdat[num].xcor + 7);
      value = toupper(getkey());
      for(i = 0; i != mdat[num].etnum; i++)
        if (mdat[num].entry[i].selc == value || value == ESC)
        {
          j = FALSE;
```

```c
      break;
    }
    if (j)
      beep();
  }
  if (value == ESC)
    return(ESC);
  h_int();
  scr_curs(mdat[num].step * i + mdat[num].ycor,
mdat[num].xcor);
  scr_printf("%c) %s", mdat[num].entry[i].selc,
mdat[num].entry[i].title);
  normal();

scr_curs(ycor, mdat[num].xcor);
  scr_puts("Are you sure (Y/N)");
  scr_curs(ycor, mdat[num].xcor + 19);
  switch(toupper(getkey()))
  {
    case 'N':
      scr_curs(mdat[num].step * i + mdat[num].ycor,
mdat[num].xcor);
      scr_printf("%c) %s", mdat[num].entry[i].selc,
mdat[num].entry[i].title);
      break;

case 'Y':
      return(value);

case ESC:
      return(ESC);

default:
      scr_curs(mdat[num].step * i + mdat[num].ycor,
mdat[num].xcor);
      scr_printf("%c) %s", mdat[num].entry[i].selc,
mdat[num].entry[i].title);
      beep();
```

```
      }
    }
  } struct menurecord *
readmenu()
{
  void fileerr();
  register  i,
            j,
            k;
  char  str[40],
        *fgets();
  struct menurecord *mendat,
                    *calloc();
  FILE  *fopen(),
        *fp;

#ifdef HD
  if ((fp = fopen("menu.dat", "r")) == NULL)
    fileerr("Error, on open of menu.dat file");
#else
  if ((fp = fopen("A:menu.dat", "r")) == NULL)
    fileerr("Error, on open of menu.dat file");
#endif
  if (fgets(str, 80, fp) == NULL)                    /* Get
the number of menus */
    fileerr("Error, on read of menu.dat file");
  else
    i = atoi(str);
  mendat = calloc(i, sizeof(struct menurecord));
  for(j = 0; j != i; j++)
  {
    if (fgets(str, 40, fp) == NULL)                  /*
Get the header      */
      fileerr("Error, on read of menu.dat file");
    else
      strcpy(mendat[j].header, str);
```

```
    if (fgets(str, 40, fp) == NULL)                    /* Get the number of */
        fileerr("Error, on read of menu.dat file"); /* menu entrys       */
    else
        mendat[j].etnum = atoi(str);

if (fgets(str, 40, fp) == NULL)
        fileerr("Error, on read of menu.dat file"); /* top of the menu   */
    else
        mendat[j].xcor = atoi(str);

if (fgets(str, 40, fp) == NULL)                    /* Get the ycor of the*/
        fileerr("Error, on read of menu.dat file");  /* top of the menu   */
    else
        mendat[j].ycor = atoi(str);

if (fgets(str, 40, fp) == NULL)                    /* Get the step of the*/
        fileerr("Error, on read of menu.dat file"); /* print of the menu */
    else
        mendat[j].step = atoi(str);

for(k=0; k!=mendat[j].etnum; k++)
    {
        if (fgets(str, 40, fp) == NULL)                /* Get the k th title */
            fileerr("Error, on read of menu.dat file"); /* entry on the menu */
        else
            strcpy(mendat[j].entry[k].title, str);

if (fgets(str, 40, fp) == NULL)                /* Get the k th selec-*/
```

```
        fileerr("Error, on read of menu.dat file"); /*
tion entry on menu */
      else
        mendat[j].entry[k].selc = str[0];
    }
  }
  if (fclose(fp) == ERR)
    fileerr("Error, on close of menu.dat file");
  return(mendat);
} void
fileerr(str)                                        /*
must make nonboot- */
char *str;                                          /*
able              */
{
  void center();
  static char *msg[] =
  {
  "Invalid function number.",
  "File not found.",
  "Path not found.",
  "No handle available: all in use.",
  "Access denied (eg attempt made to write a read-only file).",
  "Invalid handle.",
  "Memory control blocks are invalid.",
  "Not enough memory.",
  "Invalid memory block address.",
  "Invalid SET command string ('environment').",
  "Invalid format (of what, we aren't told).",
  "Invalid file access code.",
  "Invalid date.",
  "Reserved.",
  "Invalid drive specification.",
  "Requested removing current directory.",
  "Not same device.",
```

```c
     "No further files to find.",
     "File already exits on creat request",
     "Ioctl attempted on non-console."
     };

scr_clear();
  center(6, 39, str);
  scr_curs(14, 32);
  if ((errno <= 20) && (errno >= 1))
    center(14, 39, msg[errno -1]);
  else
    printf("Errno returns a %d", errno);
  center(24, 39, "Hit any key to continue");
  scr_getc();
  exit();
} void
header(str)
char *str;
{
  void  box(),
        center();
  char  buf[20],
        *asc_date(),
        *asc_time();
  union t_time date;
  long  get_time_date();

scr_clear();
  center(0, 39, "(C) Copyright 1987   Meat Processing Service Corporation   ALL RIGHTS RESERED");
  box(0, 1, 79, 23, TRUE);                                /* Make sub box for */
  scr_curs(4, 0);                                         /* the header       */
  scr_putc(204);
  scr_curs(4, 79);
```

```c
    scr_putc(185);
    hline(1, 4, 78, TRUE);
    get_time_date(&date);                                  /* Get the time for */
    center(2, 71, asc_date(&date));                        /* the header       */
    center(3, 71, asc_time(&date));
    sprintf(buf, "Plant: %s", sysinfo.id);
    center(2, 8, buf);
    center(3, 39, str);
} getkey()
{
    int i,
        x,
        y,
        scr;

char *asc_time();

union t_time  tic,
                  toc;

time(&tic);
    scr = scr_getatr();
    normal();
    for( ;scr_poll() == ERR; )
    {
        time(&toc);
        if (tic.unpack.seconds != toc.unpack.seconds)
        {
            cur(FALSE);
            scr_loc(&y, &x);
            time(&tic);
            scr_curs(3, 67);
            scr_puts(asc_time(&tic));
            scr_curs(y, x);
```

```
    cur(TRUE);
  }
  for (i = 0; i != 4; i++)
    outport(sysinfo.addr + i * 2 + 1, 0);
}
  scr_resatr(scr);
  return(scr_getc());
}
```

APPENDIX IV

```
~process.c
#include <sub.h>
include <extern.h> int xcor[4]= {00, 40, 00, 40};
int ycor[4]= {00, 00, 12, 12};
int typwin[4]= {0, 0, 0, 0};     /* Used as indexes to
the types */
int subwin[4]= {0, 0, 0, 0};     /* Used as indexes to
the subtypes */
int weight[4]= {0, 0, 0, 0};     /* Used for the weight
for a given valve */
int valve,                        /* Used for the active
valve */
    flg,                          /* Used for ending the
process funtion */
    mod;                          /* Checking if process-
ing has been done */ int msgx[] = {4, 13, 22, 31};    /* Xcor for the Mes-
sages */
char *msg[] = {                   /* Messages for update
*/
  "Closed",
  "Opened",
  "Paused",
  "Tran"
};
```

```c
char *helpmsg[] = {
  "            Help Menu",
  "",
  "F1 to select the Green  hose.",
  "F2 to select the Red    hose.",
  "F3 to select the Yellow hose.",
  "F4 to select the Blue   hose.",
  "",
  "F6 to Close  all possible hoses.",
  "F7 to Pause  all possible hoses.",
  "F8 to Resume all possible hoses.",
  "",
  "S to start  a given hose.",
  "C to close  a given hose.",
  "P to pause  a given hose.",
  "R to resume a given hose.",
  "W to enter weight for a hose.",
  "",
  "ESC to return to process menu."
};

/* Used for the clock tic and dly in update */
clock_t tic;
union t_time   yday;

process()
{
  void   printscr(),
         printtyp(),
         printsub(),
         printwei(),
         inputwei(),
         selc(),
         deselc(),
         setup_p(),
      update();

extern _attrib;
```

```
register char c;

register  time,
          i;

int *buf,
    *getbox();

long  get_time_date();

setup_p();

for(flg= TRUE; flg == TRUE;)
{ update();

if (scr_poll() == ERR)
     continue;
   scr_curs(24, 0);
   scr_eol();
   switch((c = scr_getc()))
   {
     case ESC:
        if (uninstall() == ERR)
           center(24, 39, "All valves must be closed
before exiting");
        else
           flg = FALSE;
        break;
     case F1:
     case F2:
     case F3:
     case F4:
        if (sysinfo.valnum < (c - F1 + 1))
           break;
        deselc();
        valve = c - F1;
```

```
    selc();
    break;

case UP:
case '8':
    if (!typwin[valve])
        break;
    typwin[valve]-=1;
    subwin[valve]=0;
    printtyp(TRUE);
    printsub(TRUE);
    weight[valve]=typedat[typwin[valve]].min;
    printwei(TRUE);
    break;

case DOWN:
case '2':
    if (typwin[valve] + 1 == typenum)
        break;
    typwin[valve] += 1;
    subwin[valve] = 0;
    printtyp(TRUE);
    printsub(TRUE);
    weight[valve] = typedat[typwin[valve]].min;
    printwei(TRUE);
    break;

case LEFT:
case '4':
    if (!subwin[valve])
        break;
    subwin[valve] -=1;
    printsub(TRUE);
    weight[valve] =typedat[typwin[valve]].min;
    printwei(TRUE);
    break;

case RIGHT:
case '6':
```

```
        if (subwin[valve] + 1 ==
typedat[typwin[valve]].snum)
            break;
        subwin[valve]+=1;
        printsub(TRUE);
        weight[valve]=typedat[typwin[valve]].min;
        printwei(TRUE);
        break;

case 'W':
    case 'w':
        inputwei();
        printwei(TRUE);
        break;

case 'S':
    case 's':
        time= weight[valve] /
typedat[typwin[valve]].slope[subwin[valve]] +
typedat[typwin[valve]].yint[subwin[valve]];
        if (start(valve + 1, time * 18) == ERR)
            center(24, 39, "Error, in starting a
valve");

else
        {
          if (sysinfo.valnum == 1)
            start(2, time * 18);
          if (!mod)
          {
            mod = TRUE;
            scr_curs(24,0);
            scr_eol();
            center(24, 39, "Opening CUM file");
            opencum();                          /*
Set CUM file */
            scr_eol();
            center(24, 39, "Opening DLY file");
            opendly();                          /*
```

```c
Set DLY file */
        }
        cum.date[typwin[valve]].pack=
get_time_date(NULL);
        cum.count[typwin[valve]]    += 1;
        cum.weight[typwin[valve]]   += weight[valve];
        cum.solution[typwin[valve]] += time;
        dly.count[typwin[valve]]    += 1;
        dly.weight[typwin[valve]]   += weight[valve];
        dly.solution[typwin[valve]] += time;
      }
      break;

case 'C':
    case 'c':
      if (stop(valve + 1) == ERR)
          center(24, 39, "Error, in closing a valve");
      if (sysinfo.valnum == 1)
        stop(2);
      break;

case 'P':
    case 'p':
      if (pause(valve + 1) == ERR)
          center(24, 39, "Error, in pausing a valve");
      if (sysinfo.valnum == 1)
         pause(2);
      break;

case 'R':
    case 'r':
      if (resume(valve + 1) == ERR)
          center(24, 39, "Error, in resuming a valve");
      if (sysinfo.valnum == 1)
         resume(2);
```

```
      break;

case F6:
     if (sysinfo.valnum != 1)
     {
       center(24, 39, "Close all possible valves");
       for(i = 0; i != sysinfo.valnum; i++)
         stop(i + 1);
     }
     else
       center(24, 39, "Not, available for a one hose system");
     break;

case F7:
     if (sysinfo.valnum != 1)

{
       center(24, 39, "Pause all possible valves");
       for(i = 0; i != sysinfo.valnum; i++)
         pause(i + 1);
     }
     else
       center(24, 39, "Not, available for a one hose system");
     break;

case F8:
     if (sysinfo.valnum != 1)
     {
       center(24, 39, "Resume all possible valves");
       for(i = 0; i != sysinfo.valnum; i++)
         resume(i + 1);
     }
     else
       center(24, 39, "Not, available for a one hose system");
     break;
```

```c
      case F10:
         buf = getbox(22, 2, 57, 21);
         box(22, 2, 57, 21, FALSE);
         scr_call(0x0600, _attrib << 8, 3 << 8 | 23, 20
<< 8 | 56);
         for (i = 0; i != 18; i++)
         {
           scr_curs(3 + i, 24);
           scr_puts(helpmsg[i]);
         }
         hit_any_key(FALSE);
         center(24, 39, "                        ");
         putbox(22, 2, 57, 21, buf);
         default:
            break;
      }
   }
   if (mod)
   {
     scr_curs(24,0);
     scr_eol();
     center(24, 39, "Updating CUM file");
     writecum();
     scr_eol();
     center(24, 39, "Updating DLY file");
     writedly();
   }
   cur(TRUE);
   scr_echo(TRUE);
 } void
 setup_p()
 {
   register i;
   clock_t clock();
   long  get_time_date();
```

```
    cur(FALSE);
    scr_echo(FALSE);
    scr_clear();
    center(12, 39, "Please wait one moment");
    if (install() == ERR)
    {
      flg=FALSE;
      return;
    } scr_clear();
  for(valve = 0; valve != sysinfo.valnum; valve++)
  {
    printscr(FALSE);
    printtyp(FALSE);
    printsub(FALSE);
    weight[valve]=typedat[typwin[valve]].min;
    printwei(FALSE);
  }
  valve = 0;                                              /*
Setup Default Valve */
  mod = FALSE;                                            /*
Setup Mod. Flag to False */
  selc();
  tic = clock() / CLK_TCK;
  get_time_date(&yday);                                   /*
Setup Time & Date for YDAY */
} void
inputwei()
{
  register char c;
  register int i;
  char   buf[5],
         mess[60];

scr_curs(7 + ycor[valve], 13 + xcor[valve]);
  scr_puts("      ");
```

```c
scr_curs(7 + ycor[valve], 13 + xcor[valve]);
reverse();
scr_putc(' ');

for(i=0; i != 4;)
{
   update();
   if (scr_poll() != ERR)
   {
      h_int();
      c = scr_getc();
      if (!isdigit(c) && c != '\r' && c != '\b')
         continue;
      switch(c)
      {
        case '\r':
           buf[i] = '\0';
           normal();
           weight[valve]= atoi(buf);
           if (weight[valve] >
typedat[typwin[valve]].max || weight[valve] <
typedat[typwin[valve]].min)
              {
                sprintf(mess, "The weight of a %s must be
between %d and %d.", typedat[typwin[valve]].type,
typedat[typwin[valve]].min,
typedat[typwin[valve]].max);
                center(24, 39, mess);
                inputwei();
                scr_curs(24, 0);
                scr_eol();
              }
           return;

case '\b':
           if (i != 0)
           {
              normal();
```

```
                scr_curs(7 + ycor[valve], 13 + i +
xcor[valve]);
                scr_putc(' ');
                i -= 1;
                scr_curs(7 + ycor[valve], 13 + i +
xcor[valve]);
                scr_putc(' ');
                i -= 1;
              }
              else
                buf[0]='0';
              break;

default:
                scr_curs(7 + ycor[valve], 13 + i +
xcor[valve]);
                buf[i] = c;
                scr_putc(c);
            }
            i += 1;
            scr_curs(7 + ycor[valve], 13 + i + xcor[valve]);
            reverse();
            scr_putc(' ');
        }
    }
    buf[i] = '\0';
    normal();
    weight[valve]= atoi(buf);
    if (weight[valve] > typedat[typwin[valve]].max ||
weight[valve] < typedat[typwin[valve]].min)
    {
       sprintf(mess, "The weight of a %s must be between
%d and %d.", typedat[typwin[valve]].type,
typedat[typwin[valve]].min,
typedat[typwin[valve]].max);
       center(24, 39, mess);
       inputwei();
       scr_curs(24, 0);
```

```c
    scr_eol();
  }
} void
printwei(highlight)
int highlight;
{
  if (highlight)
    h_int();
  scr_curs(7 + ycor[valve], 13 + xcor[valve]);
  scr_printf("%4d ", weight[valve]);
  normal();
} void
update()
{
  register  i,
            j,
            k;
  long get_time_date();
  union t_time  date;
  clock_t clock();

cur(FALSE);

for(i = 0; i != sysinfo.valnum; i++)
  {
    j = poll(i + 1);
    for(k = 0; k != 4; k++)
    {
      scr_curs(10 + ycor[i], msgx[k] + xcor[i]);
      if (k == j)
        reverse();
      else
        normal();
      scr_puts(msg[k]);
```

```
    }
  normal();
}
scr_curs(24, 67);
scr_printf("F10 for help");

if (pw[pwnum].date.pack < get_time_date(NULL))
  if (uninstall() != 1)
    flg= FALSE;

get_time_date(&date);
if (yday.semi.d != date.semi.d)
{
  yday.pack= date.pack;
  scr_curs(24,0);
  scr_eol();
  center(24, 39, "Updating DLY file");
  midnight();
} if ((clock() / CLK_TCK - tic) > 180)
{
  tic= clock() / CLK_TCK;
  if (mod)
  {
    scr_curs(24,0);
    scr_eol();
    center(24, 39, "Updating CUM file");
    writecum();
    scr_eol();
    center(24, 39, "Updating DLY file");
    writedly();
  }
}
} flush()
{
```

```
  register i,
           j,
           k;

char *asc_time();

union t_time  tic,
                toc;

scr_clear();
  cur(FALSE);
  scr_echo(FALSE);
  center(12, 39, "Please wait one moment");
  if (install() == ERR)
     return(ERR);
  header("Recirculation Control");

show();
  center(24, 39, "Hit any key to begin recirculation.");
  for( ;scr_poll() == ERR; )
  {
     time(&toc);
     if (tic.unpack.seconds != toc.unpack.seconds)
     {
        time(&tic);
        scr_curs(3, 67);
        scr_puts(asc_time(&tic));
     }
  }
  scr_getc();
  scr_curs(24, 0);
  scr_eol();
  center(24, 39, "Hit any key to stop recirculation.");

for (i = 0; i != sysinfo.valnum; i++)
  {
```

```
  if (start(i + 1, 300 * 18) == ERR)
  {
    uninstall();
    return(ERR);
  }
  time(&tic);
  scr_curs(3, 67);
  scr_puts(asc_time(&tic));
  show();
} time(&tic);
for (;;)
{
  show();

if (!poll(sysinfo.valnum))
    break;

time(&toc);
  if (tic.unpack.seconds != toc.unpack.seconds)
  {
    time(&tic);
    scr_curs(3, 67);
    scr_puts(asc_time(&tic));
  }
   if (scr_poll() != ERR)
   {
     scr_getc();
     scr_curs(24, 0);
     scr_eol();
     center(24, 39, "Now stopping recirculation.");
     for (i = 0; i != sysinfo.valnum; i++)
     {
       stop(i + 1);
       time(&tic);
       scr_curs(3, 67);
       scr_puts(asc_time(&tic));
```

```
      show();
    }
    break;
  }
} if (uninstall() == ERR)
  return(ERR);

scr_curs(24, 0);
scr_eol();
hit_any_key(TRUE);
scr_echo(TRUE);
cur(TRUE);
} show()
{
  register i,
           j,
           k;
  static int fycor[4]= {0, 0, 8, 8};
  static char *msgvalve[] = {" Green", "  Red",
"Yellow", " Blue"};

for(i = 0; i != sysinfo.valnum; i++)
  {
    scr_curs(8 + fycor[i], 16 + xcor[i]);
    scr_puts(msgvalve[i]);

j = poll(i + 1);
    for(k = 0; k != 4; k++)
    {
      scr_curs(10 + fycor[i], msgx[k] + xcor[i]);
      if (k == j)
        reverse();
      else
        normal();
```

```c
      scr_puts(msg[k]);
    }
    normal();
  }
} void
opencum()
{
  register i,
           fd;
  long get_time_date();
  void fileerr();

switch(access(filcum, 0))
  {
    case ERR:
      if ((fd= open(filcum, O_WRONLY + O_CREAT)) == ERR)
        fileerr("Error, in opening CUM file.");
      for(i = 0; i != typenum; i++)
      {
        cum.date[i].pack= get_time_date(NULL);
        cum.count[i]    = 0L;
        cum.weight[i]   = 0L;
        cum.solution[i] = 0L;
      }
      if (write(fd, &cum, sizeof(cum)) == ERR)
        fileerr("Error, in writing CUM FILE");
      break;

case 0:
      if ((fd= open(filcum, O_RDONLY)) == ERR)
        fileerr("Error, in opening CUM file.");
      if (read(fd, &cum, sizeof(cum)) == ERR)
        fileerr("Error, in reading CUM File");
  }
  if (close(fd) == ERR)
```

```
            fileerr("Error, in closing CUM file");
}

/* Write the cum file to disk at the position (tof)
*/
void
writecum()
{
   register fd;

if ((fd= open(filcum, O_WRONLY)) != ERR)
   {
      if (write(fd, &cum, sizeof(cum)) == ERR)
         fileerr("Can't Write CUM FILE");
   }
    else
       fileerr("Can't Open CUM File");
     if (close(fd) == ERR)
        fileerr("Can't Close CUM File");
} void
opendly()
{
   register  i,
             fd;
   long   get_time_date();
   union  t_time  date;
   void   fileerr(),
          zerodly();

switch(access(fildly, 0))
   {
     case ERR:
/* DLY file not exist */
         if ((fd= open(fildly, O_WRONLY + O_CREAT)) == ERR)
            fileerr("Error, in opening DLY file.");
```

```c
        zerodly(fd);
        break;

case 0:
/* DLY file exist      */
        if ((fd= open(fildly, O_RDWR)) == ERR)
          fileerr("Error, in opening DLY file.");
        if (lseek(fd, -(long) (sizeof(dly)), 2) == ERR)
           fileerr("Error, in seeking in DLY file.");
        if (read(fd, &dly, sizeof(dly)) == ERR)
           fileerr("Error, in reading DLY File");
        get_time_date(&date);
        if (dly.date[0].semi.d != date.semi.d)
/* Wrong date get new */
          zerodly(fd);
/* date               */
   } if (close(fd) == ERR)
      fileerr("Error, in closing DLY file");
}

/* Write the dly file to disk at the position (eof) -
sizeof(dly)         */
void
writedly()
{
   register fd;

if ((fd= open(fildly, O_WRONLY)) != ERR)
   {
     if (lseek(fd, -(long) (sizeof(dly)), 2) == ERR)
        fileerr("Error, in seeking in DLY file.");
     if (write(fd, &dly, sizeof(dly)) == ERR)
        fileerr("Can't Write DLY FILE");
   }
   else
      fileerr("Can't Open DLY File");
```

```c
   if (close(fd) == ERR)
     fileerr("Can't close DLY file");
}

/* Updates DLY file at midnight
*/
void
midnight()
{
   register  fd;

writedly();
   if ((fd= open(fildly, O_WRONLY + O_CREAT)) == ERR)
     fileerr("Error, in opening DLY file.");
   zerodly(fd);
   if (close(fd) == ERR)
     fileerr("Can't close DLY file");
}

/* Find end of file and zero out the dly struct. Then set the struct to */
/* today and the rest to zero. Finish by appending it to the end of DLY */
void
zerodly(fd)
int fd;
{
   register  i;
   long get_time_date();

for(i = 0; i != typenum; i++)
   {
     dly.date[i].pack= get_time_date();
     dly.count[i]    = 0L;
     dly.weight[i]   = 0L;
     dly.solution[i] = 0L;
   }
   if (lseek(fd, 0L, 2) == ERR)
```

```
        fileerr("Error, in seeking in DLY file.");
      if (write(fd, &dly, sizeof(dly)) == ERR)
        fileerr("Error, in writing DLY FILE");
}
copyfiles()
{
  register  fd,
            i,
            j;

char  buf[16],
        *asc_date();

long  count,
        weight,
        solution,
        time;

FILE *fopen(), *fp;

count    = 0L;
  weight   = 0L;
  solution = 0L;
  time     = 0L;
  header("Copy DLY & CUM Files");
  scr_echo(FALSE);

switch(access(filcum, 0))
  {
    case ERR:
      center(13, 39, "No processing has occured.");
      hit_any_key(TRUE);
      return;
      break;

case 0:
      if ((fd= open(filcum, O_RDONLY)) == ERR)
        fileerr("Error, in opening CUM file.");
```

```c
      if (read(fd, &cum, sizeof(cum)) == ERR)
         fileerr("Error, in reading CUM File");
   }
   if (close(fd) == ERR)
      fileerr("Error, in closing CUM file");

center(11, 39, "Please, remove the DLY disk from drive B.");
   center(12, 39, "Then replace it with blank formatted disk.");
   hit_any_key(TRUE);

#ifdef HD
   if ((fp = fopen("account.cum", "w")) == NULL)
      fileerr("Error, in write of account.cum");
#else
   if ((fp = fopen("B:account.cum", "w")) == NULL)
      fileerr("Error, in write of account.cum");
#endif
   fprintf(fp, "Plant ID: %-s \n", sysinfo.id);
   fprintf(fp, "Type            Date        Time     Count Weight(lb) Time(sec) Solution(L)\n");
   for(i = 0; i!= typenum; i++)
   {
      fprintf(fp, "%-15s", typedat[i].type);
      fprintf(fp, "  %8s", asc_date(&cum.date[i]));
      fprintf(fp, "  %8s", asc_time(&cum.date[i]));
      fprintf(fp, " %6ld", cum.count[i]);
      fprintf(fp, "  %8ld", cum.weight[i]);
      fprintf(fp, " %8ld", cum.solution[i]);
      fprintf(fp, "   %8ld\n", cum.solution[i] * sysinfo.flow / 60);
      count += cum.count[i];
      weight += cum.weight[i];
      time += cum.solution[i];
      solution+=cum.solution[i] * sysinfo.flow / 60;
```

```
    }
    fprintf(fp, "Totals                                          %6ld
%8ld  %8ld   %8ld", count, weight, time, solution);
    if (fclose(fp) == ERR)
       fileerr("Error, in close of account.cum");
    center(11, 39, "
");
    center(12, 39, "
");
    scr_curs(24, 0);
    scr_eol();

center(11, 39, "Please, remove the program disk from
drive A.");
    center(12, 39, "Then replace it with the DLY removed
earlier.");
    hit_any_key(TRUE);

#ifdef HD
    if ((fp = fopen("account.dly", "w")) == NULL)
       fileerr("Error, in write of account.dly");
#else
    if ((fp = fopen("B:account.dly", "w")) == NULL)
       fileerr("Error, in write of account.dly");
endif if ((fd = open(fildly, O_RDONLY)) == ERR)
       fileerr("Error, in opening DLY file.");
    fprintf(fp, "Plant ID: %-s\n", sysinfo.id);
    for(j = read(fd, &dly, sizeof(dly)); j != 0; j =
read(fd, &dly, sizeof(dly)))
    {
       if (j == ERR)
          fileerr("Error, in reading DLY File");
       for(i = 0; i != typenum; i++)
       {
          fprintf(fp, "%-15s", typedat[i].type);
          fprintf(fp, " %s", asc_date(&dly.date[i]));
```

```c
      fprintf(fp, " %6ld", dly.count[i]);
      fprintf(fp, " %8ld lb.", dly.weight[i]);
      fprintf(fp, " %8ld sec.", dly.solution[i]);
      fprintf(fp, " %8ld L.\n", dly.solution[i] *
sysinfo.flow / 60);
    }
  }
  if (close(fd) == ERR)
    fileerr("Can't close DLY file");
  if (fclose(fp) == ERR)
    fileerr("Error, in close of account.dly");
  center(11, 39, "
");
  center(12, 39, "
");
  scr_curs(24, 0);
  scr_eol();

center(11, 39, "Please, place the program disk in drive A.");
  center(12, 39, "Then place the DLY disk in drive B.");
  hit_any_key(TRUE);

#ifdef HD
  sprintf(buf, "del %s", filcum);
#else
  sprintf(buf, "A:del %s", filcum);
#endif
  system(buf);
#ifdef HD
  sprintf(buf, "del %s", fildly);
#else
  sprintf(buf, "A:del %s", fildly);
#endif
  system(buf);
  scr_echo(TRUE);
}
```

```
void
readtype()
{
  void fileerr();
  register i,
           j;
  char  str[40],
        *malloc();
  struct typerecord *calloc();
  FILE  *fopen(),
        *fp;

#ifdef HD
  if ((fp=fopen("type.dat", "r")) == NULL)
    fileerr("Error, on open of type.dat file");
#else
  if ((fp=fopen("A:type.dat", "r")) == NULL)
    fileerr("Error, on open of type.dat file");
#endif
  if (fgets(str, 80, fp) == 0)
    fileerr("Error, on read of type.dat file");
  else
    typenum= atoi(str);
  typedat= calloc(typenum, sizeof(struct typerecord));
  for(i=0; i!= typenum; i++)
  {
    if (fgets(str, 80, fp) == 0)                                        /*
Get the type     */
      fileerr("Error, on read of type.dat file");
    else
    {
      str[strlen(str) - 1]= '\0';
      typedat[i].type= malloc(strlen(str) + 2);
      strcpy(typedat[i].type, str);
    }
    if (fgets(str, 80, fp) == 0)                                        /*
get the number of   */
      fileerr("Error, on read of type.dat file");   /*
```

```
sub type                   */
    else
        typedat[i].snum= atoi(str);
    for(j=0; j != typedat[i].snum; j++)
    {
        if (fgets(str, 80, fp) == 0)                    /*
Get the Kth subtype*/
            fileerr("Error, on read of type.dat file");
        else
        {
            str[strlen(str) - 1]= '\0';
            typedat[i].stype[j]= malloc(strlen(str) + 2);
            strcpy(typedat[i].stype[j], str);
        }
        if (fgets(str, 80, fp) == 0)                    /*
get the slope         */
            fileerr("Error, on read of type.dat file");
        else
            typedat[i].slope[j]= atoi(str);
        if (fgets(str, 80, fp) == 0)                    /*
get the Y-intercept*/
            fileerr("Error, on read of type.dat file");
        else
            typedat[i].yint[j]= atoi(str);
    }
    if (fgets(str, 80, fp) == 0)                        /*
get the min. weight*/
        fileerr("Error, on read of type.dat file");
    else
        typedat[i].min= atoi(str);
    if (fgets(str, 80, fp) == 0)                        /*
get the max. weight*/
        fileerr("Error, on read of type.dat file");
    else
        typedat[i].max= atoi(str);
    }
    fclose(fp);
}
```

```c
void
printscr()
{
  box(xcor[valve], ycor[valve], 39 + xcor[valve], 11 + ycor[valve], 0);
  scr_curs(1 + ycor[valve], 16 + xcor[valve]);
  switch(valve)
    {
      case 0:
        scr_puts(" Green");
        break;

case 1:
        scr_puts("  Red");
        break;

case 2:
        scr_puts("Yellow");
        break;

case 3:
        scr_puts(" Blue");
        break;
    }
  box(2 + xcor[valve], 2 + ycor[valve], 37 + xcor[valve], 6 + ycor[valve], 0);
  scr_curs(2 + ycor[valve], 20 + xcor[valve]);
  scr_putc(194);
  vline(20 + xcor[valve], 3 + ycor[valve], 3, FALSE);
  scr_curs(6 + ycor[valve], 20 + xcor[valve]);
  scr_putc(193);
  scr_curs(3 + ycor[valve], 1 + xcor[valve]);
  scr_putc(24);
/* Up arrow    */
  scr_curs(5 + ycor[valve], 1 + xcor[valve]);
  scr_putc(25);
/* Down Arrow */
  scr_curs(3 + ycor[valve], 38 + xcor[valve]);
```

```c
    scr_putc(26);
/* Right Arrow */
    scr_curs(5 + ycor[valve], 38 + xcor[valve]);
    scr_putc(27);
/* Left Arrow  */
    scr_curs(7 + ycor[valve], 5 + xcor[valve]);
    scr_puts("W)eight:        S)tart   C)lose");
    scr_curs(8 + ycor[valve], 22 + xcor[valve]);
    scr_puts("P)ause   R)esume");
    scr_curs(10 + ycor[valve], 4 + xcor[valve]);
    scr_puts("Closed    Opened    Paused    Tran");
} void
printtyp(highlight)
int highlight;
{
   scr_curs(3 + ycor[valve], 4 + xcor[valve]);
    if (!typwin[valve])
      scr_printf("      TOP      ");
    else
      scr_printf("%-15s", typedat[typwin[valve] - 1].type);
    if (highlight)
       h_int();
    scr_curs(4 + ycor[valve], 4 + xcor[valve]);
    scr_printf("%-15s", typedat[typwin[valve]].type);
    normal();
    scr_curs(5 + ycor[valve], 4 + xcor[valve]);
    if ((typwin[valve] + 1) == typenum)
       scr_printf("     BOTTOM    ");
    else
       scr_printf("%-15s", typedat[typwin[valve] + 1].type);
} void
printsub(highlight)
```

```
int highlight;
{
  scr_curs(3 + ycor[valve], 22 + xcor[valve]);
  if (!subwin[valve])
    scr_printf("      TOP      ");
  else
    scr_printf("%-15s",
typedat[typwin[valve]].stype[subwin[valve] - 1]);
  if (highlight)
    h_int();
  scr_curs(4 + ycor[valve], 22 + xcor[valve]);
  scr_printf("%-15s",
typedat[typwin[valve]].stype[subwin[valve]]);
  normal();
  scr_curs(5 + ycor[valve], 22 + xcor[valve]);
  if ((subwin[valve] + 1) ==
typedat[typwin[valve]].snum)
    scr_printf("     BOTTOM    ");
  else
    scr_printf("%-15s",
typedat[typwin[valve]].stype[subwin[valve] + 1]);
} void
selc()
{
  printtyp(TRUE);
  printsub(TRUE);
  printwei(TRUE);
  h_int();
  box(xcor[valve], ycor[valve], 39 + xcor[valve], 11 +
ycor[valve], 0);
  scr_curs(1 + ycor[valve], 16 + xcor[valve]);
  switch(valve)
  {
    case 0:
      scr_puts(" Green");
      break;
```

```
    case 1:
      scr_puts("  Red");
      break;

case 2:
      scr_puts("Yellow");
      break;

case 3:
      scr_puts(" Blue");
      break;
  }
  normal();
} void
deselc()
{
  printtyp(FALSE);
  printsub(FALSE);
  printwei(FALSE);
  box(xcor[valve], ycor[valve], 39 + xcor[valve], 11 + ycor[valve], 0);
  scr_curs(1 + ycor[valve], 16 + xcor[valve]);
  switch(valve)
  {
    case 0:
      scr_puts(" Green");
      break;

case 1:
      scr_puts("  Red");
      break;

case 2:
      scr_puts("Yellow");
      break;
```

```c
    case 3:
      scr_puts("  Blue");
      break;
    }
  }
```

APPENDIX V

~admin.c

```c
#include <sub.h>
include <extern.h> void
changeid()
{
  void writesysinfo();
  static struct input_record iddat = {
  /* X    Y    L   Title              Special    Ret Typ Rtn Tab    Ent    Sho */
    10, 10, 06, "Plant ID: ",       "",        "", 6, TRUE, FALSE, FALSE, TRUE };
  static struct input_record atdat = {
    50, 10, 03, "Actuator Time: ",  "",        "", 7, TRUE, FALSE, FALSE, TRUE };
  static struct input_record fldat = {
    30, 15, 03, "Rate of Flow: ",   "",        "", 7, TRUE, FALSE, FALSE, TRUE };
  static struct input_record vadat = {
    10, 20, 02, "Number of Valves: ", "",      "", 7, TRUE, FALSE, FALSE, TRUE };
  static struct input_record addat = {
    50, 20, 06, "Base Address: ",   "",        "", 7, TRUE, FALSE, FALSE, TRUE };

header("Change System Information");
  for(;;)
  {
    scr_curs(8, 10);
    scr_printf("Old Plant ID: %s", sysinfo.id);
    scr_curs(8, 50);
```

```
    scr_printf("Old Actuator Time: %2d tics",
sysinfo.acttime);
    scr_curs(13, 30);
    scr_printf("Old Flow Rate: %3d L/Min",
sysinfo.flow);
    scr_curs(18, 10);
    scr_printf("Old Number of Valves: %1d",
sysinfo.valnum);
    scr_curs(18, 50);
    scr_printf("Old Base Address: %5d", sysinfo.addr);

strcpy(iddat.rtn.str, sysinfo.id);
    if (input(&iddat) == ESC)
      break;
    strcpy(sysinfo.id, iddat.rtn.str);

atdat.rtn.in= sysinfo.acttime;
    if (input(&atdat) == ESC)
      break;
    sysinfo.acttime= atdat.rtn.in;

fldat.rtn.in= sysinfo.flow;
    if (input(&fldat) == ESC)
      break;
    sysinfo.flow= fldat.rtn.in;

vadat.rtn.in= sysinfo.valnum;
    if (input(&vadat) == ESC)
      break;
    sysinfo.valnum= vadat.rtn.in;

addat.rtn.in= sysinfo.addr;
    if (input(&addat) == ESC)
      break;
    sysinfo.addr= addat.rtn.in;
  }
  center(24, 39, "Now saving System file.");
```

```c
    writesysinfo();
} void
readsysinfo()
{
   register  i,
             j,
             m,
             d,
             y;

char  str[32],
         *malloc();

FILE  *fopen(),
         *fp;

#ifdef HD
    if ((fp = fopen("SYSINFO.DAT","r")) == NULL)
       fileerr("Error, in opening of SYSINFO.DAT");
#else
    if ((fp = fopen("A:SYSINFO.DAT","r")) == NULL)
       fileerr("Error, in opening of SYSINFO.DAT");
#endif
     else
     {
      if (fgets(str, 32, fp) == 0)                              /* Read plant id        */
         fileerr("Error 1a, in reading of SYSINFO.DAT");
      str[strlen(str)-1]= '\0';
      sysinfo.id= malloc(strlen(str) + 2);
      strcpy(sysinfo.id, str);

if (fgets(str, 32, fp) == 0)                              /*
```

```
Read actuater time    */
      fileerr("Error 1b, in reading of SYSINFO.DAT");
   str[strlen(str)-1]= '\0';
   sysinfo.acttime= atoi(str);

if (fgets(str, 32, fp) == 0)                           /*
Read number of valves*/
      fileerr("Error 1c, in reading of SYSINFO.DAT");
   str[strlen(str)-1]= '\0';
   sysinfo.valnum= atoi(str);

if (fgets(str, 32, fp) == 0)                           /*
Read base address     */
      fileerr("Error 1d, in reading of SYSINFO.DAT");
   str[strlen(str)-1]= '\0';
   sysinfo.addr= atoi(str);

if (fgets(str, 32, fp) == 0)                           /*
Read flow time        */
      fileerr("Error 1e, in reading of SYSINFO.DAT");
   str[strlen(str)-1]= '\0';
   sysinfo.flow= atoi(str);

for(i = 0; i != 6; i++)
   {
      if (fgets(pw[i].title, 32, fp) == 0)                /*
Read pw title         */
         fileerr("Error 2a, in reading of SYSINFO.DAT");
      pw[i].title[strlen(pw[i].title)-1]= '\0';
      if (fgets(str, 32, fp) == 0)                        /*
Read date for the pw */
         fileerr("Error 2b, in reading of SYSINFO.DAT");
      j = sscanf(str, "%d/%d/%d", &m, &d, &y);
      if (j == 3)                                         /*
Check format od date */
      {
         set_date(&pw[i].date, m, d, y);
         set_time(&pw[i].date, 23,59,58);
```

```c
      }
    else
       fileerr("Error 2c, in reading of SYSINFO.DAT");
    }
    for(i = 0; i != 6; i++)
    {
      if (fgets(oper[i].name, 32, fp) == 0)          /*
Read Operator Name    */
         fileerr("Error 2d, in reading of SYSINFO.DAT");
      oper[i].name[strlen(oper[i].name) - 1] = '\0';
    }
  }
  if (fclose(fp) == -1)
    fileerr("Error, on close of SYSINFO.DAT");
} void
writesysinfo()
{
  register i;
  char *asc_date();
  FILE  *fopen(),
        *fp;

#ifdef HD
  if ((fp = fopen("SYSINFO.DAT","w")) == NULL)
    fileerr("Error, in opening of SYSINFO.DAT");
#else
  if ((fp = fopen("A:SYSINFO.DAT","w")) == NULL)
    fileerr("Error, in opening of SYSINFO.DAT");
#endif
  else
{
  fprintf(fp, "%s\n", sysinfo.id);
  fprintf(fp, "%d\n", sysinfo.acttime);
  fprintf(fp, "%d\n", sysinfo.valnum);
  fprintf(fp, "%d\n", sysinfo.addr);
  fprintf(fp, "%d\n", sysinfo.flow);
  for(i = 0; i != 6; i++)
```

```c
        {
            fprintf(fp, "%s\n", pw[i].title);
            fprintf(fp, "%s\n", asc_date(&pw[i].date));
        }
        for(i = 0;  i != 6; i++)
            fprintf(fp, "%s\n", oper[i].name);
    }
    if (fclose(fp) == -1)
        fileerr("Error, in closing of SYSINFO.DAT");
} void
changepw()
{
    void  writesysinfo(),
          printpw();
    static struct input_record padat = {
    /* X    Y    L    Title          Special         Ret Typ Rtn
    Tab    Ent    Sho */
        04, 20, 16, "Password: ",    "",             "", 06,
    TRUE, FALSE, FALSE, TRUE };
    static struct input_record dadat = {
        49, 20, 00, "Date: ",        "NN/NN/NN", "", 03,
    TRUE, FALSE, FALSE, TRUE };
    register   i,
               j,
               k,
               flg;
    char   c,
           *asc_date();
    int    *m,
           *d,
           *y;

scr_echo(1);
    header("Change Password Menu");
    scr_curs(7, 14);
    scr_puts("Number               Password
```

```c
Date");
box(10, 8, 69, 15, 0);
for(i = 0; i != 6; i++)
   printpw(i);
for(;;)
{
   do
   {
      scr_curs(18, 4);
      scr_puts("Which:   ");
      scr_curs(18, 11);
      if ((c = getkey()) == ESC)
      {
         center(24, 39, "Now saving PW file.");
         writesysinfo();
         return;
      }
      i = (int) (c - '0') - 1;
   }
   while(i < 0 || i > 5);
   h_int();
   printpw(i);
   strcpy(padat.rtn.str, pw[i].title);
   if (input(&padat) == ESC)
   {
      center(24, 39, "Now saving PW file.");
      writesysinfo();
      return;
   }
   strcpy(pw[i].title, padat.rtn.str);

if (i > 1)
   {
      do
      {
         strcpy(dadat.rtn.str, asc_date(&pw[i].date));
         k = strlen(dadat.rtn.str);
         for(j = 0; j != k; j++)
```

```
            if (dadat.rtn.str[j] == ' ')
              dadat.rtn.str[j] = '0';
         if (input(&dadat) == ESC)
         {
           center(24, 39, "Now saving PW file.");
           writesysinfo();
           return;
         }
         sscanf(dadat.rtn.str, "%d/%d/%d", &m, &d, &y);
      }
      while(!m || !d || y < 86 || m > 12 || d > 31);
      set_date(&pw[i].date, m ,d, y);
      set_time(&pw[i].date, 23, 59, 58);
    }
    else
    {
      set_date(&pw[i].date, 0 ,0, 80);
      set_time(&pw[i].date, 23, 59, 58);
    }
    normal();
    printpw(i);
    scr_curs(20,4);
        scr_puts("
");
      }
    } void
printpw(i)
int i;
{
  char *asc_date();

scr_curs(9 + i, 16);
  scr_printf("%d)   %-32s  ", i + 1, pw[i].title);
  switch(i)
      {
        case 0:
```

```c
            scr_puts("Admin PW");
            break;
        case 1:
            if (pw[i].date.unpack.month == 0)
                scr_puts("Daily PW +");
            else
                scr_puts("Daily PW -");
            break;
        default:
            scr_printf("%s", asc_date(&pw[i].date));
    }
} void
readlog()
{
    register i,
             j,
             fd;
    switch(access("LOGFILE.DAT", 0))
    {
        case ERR:
#ifdef HD
            if ((fd = open("LOGFILE.DAT", O_WRONLY +
O_CREAT)) == ERR)
#else
            if ((fd = open("A:LOGFILE.DAT", O_WRONLY +
O_CREAT)) == ERR)
#endif
                fileerr("Error, in opening LOG file.");
            for(j = 0; j != 6; j++)
                for(i = 0; i != MAXOPER; i++)
                {
                    oper[j].intime[i].pack = 0L;
                    oper[j].outime[i].pack = 0L;
                }
            for(j = 0; j != 6; j++)
```

```
            {
                if (write(fd, oper[j].intime, MAXOPER *
sizeof(union t_time)) == ERR)
                    fileerr("Error, in writing LOG FILE");
                if (write(fd, oper[j].outime, MAXOPER *
sizeof(union t_time)) == ERR)
                    fileerr("Error, in writing LOG FILE");
            }
            break;

case 0:
#ifdef HD
            if ((fd = open("LOGFILE.DAT", O_RDONLY)) == ERR)
#else
            if ((fd = open("A:LOGFILE.DAT", O_RDONLY)) ==
ERR)
#endif
                fileerr("Error, in opening LOG file.");
            for(j = 0; j != 6; j++)
            {
                if (read(fd, oper[j].intime, MAXOPER *
sizeof(union t_time)) == ERR)
                    fileerr("Error, in reading LOG File");
                if (read(fd, oper[j].outime, MAXOPER *
sizeof(union t_time)) == ERR)
                    fileerr("Error, in reading LOG File");
            }
        }
        if (close(fd) == ERR)
            fileerr("Error, in closing LOG file");
} void
writelog()
{
    register   i,
                fd;
```

```
    center(24, 39, "Updating LOG file");
#ifdef HD
    if ((fd = open("LOGFILE.DAT", O_WRONLY)) == ERR)
#else
    if ((fd = open("A:LOGFILE.DAT", O_WRONLY)) == ERR)
#endif
        fileerr("Error, in opening LOG file.");
    for(i = 0; i != 6; i++)
    {
        if (write(fd, oper[i].intime, MAXOPER *
sizeof(union t_time)) == ERR)
            fileerr("Error, in writing LOG FILE");
        if (write(fd, oper[i].outime, MAXOPER *
sizeof(union t_time)) == ERR)
            fileerr("Error, in writing LOG FILE");
    }
    if (close(fd) == ERR)
        fileerr("Error, in closing LOG file");
} void
login()
{
    int i;

long get_time_date();

if (oper[opnum].intime[MAXOPER - 1].pack == 0L)
    {
        for(i = 0; i != MAXOPER; i++)
            if (oper[opnum].intime[i].pack == 0L)
                break;
    }
    else
        for(i = 0; i != MAXOPER - 1; i++)
            oper[opnum].intime[i].pack = oper[opnum].intime[i
 + 1].pack;
    oper[opnum].intime[i].pack = get_time_date(NULL);
    oper[opnum].outime[i].pack = 0L;
```

}

```c
void
logout()
{
  int i;

long get_time_date();
  for(i = 0; i != MAXOPER; i++)
    if (oper[opnum].intime[i].pack != 0L &&
oper[opnum].outime[i].pack == 0L)
       break;
  oper[opnum].outime[i].pack = get_time_date(NULL);
} void
changeop()
{
  void   writesysinfo();

static struct input_record namedat = {
  /* X    Y    L  Title              Special     Ret Typ Rtn
Tab    Ent    Sho */
     26, 20, 16, "Operator: ",    "",         "", 01,
TRUE, FALSE, FALSE, TRUE };

register  i;
  char      c;

scr_echo(1);
  header("Change Operator Menu");
  scr_curs(7, 25);
  scr_puts("Number        Operator");
  box(23, 8, 55, 15, 0);
  for(i = 0; i != 6; i++)
  {
    scr_curs(9 + i, 27);
    scr_printf("%d)      %-16s ", i + 1,
```

```
      oper[i].name);
    }
    for(;;)
    {
      do
      {
        scr_curs(17, 26);
        scr_puts("Which:   ");
        scr_curs(17, 33);
        if ((c = getkey()) == ESC)
        {
          center(24, 39, "Now saving System file.");
          writesysinfo();
          return;
        }
        i = (int) (c - '0') - 1;
      }
      while(i < 0 || i > 5);
      h_int();
      scr_curs(9 + i, 27);
      scr_printf("%d)       %-16s ", i + 1,
oper[i].name);
      normal();
      strcpy(namedat.rtn.str, oper[i].name);
      if (input(&namedat) == ESC)
      {
        center(24, 39, "Now saving System file.");
        writesysinfo();
        return;
      }
      strcpy(oper[i].name, namedat.rtn.str);
      scr_curs(9 + i, 27);
      scr_printf("%d)       %-16s ", i + 1,
oper[i].name);
      scr_curs(20, 26);
      scr_puts("                                        ");
    }
  }
```

APPENDIX VI

```c
~print.c
#include "sub.h"
#include "extern.h"

/* Printout the cum file.
*/
void
printcum()
{
  register  i,
            fd;

char   *asc_date(),
         *asc_time();

long   count,
         weight,
         solution,
         time;

count    = 0L;
  weight   = 0L;
  solution = 0L;
  time     = 0L;

header("Print CUM File");

switch(access(filcum, 0))
  {
    case ERR:
      center(13, 39, "No processing has occured.");
      hit_any_key(TRUE);
      return;
      break;

case 0:
      if ((fd= open(filcum, O_RDONLY)) == ERR)
```

```c
      fileerr("Error, in opening CUM file.");
    if (read(fd, &cum, sizeof(cum)) == ERR)
      fileerr("Error, in reading CUM File");
  }
  if (close(fd) == ERR)
    fileerr("Error, in closing CUM file");

scr_curs(8, 2);
  scr_printf("Plant ID: %-s", sysinfo.id);
  scr_curs(10, 2);
  scr_printf("Type             Date      Time
Count Weight(lb) Time(sec) Solution(L)");
  for(i = 0; i != typenum; i++)
  {
    scr_curs(11 + i, 2);
    scr_printf("%-15s", typedat[i].type);
    scr_printf(" %8s", asc_date(&cum.date[i]));
    scr_printf(" %8s", asc_time(&cum.date[i]));
    scr_printf(" %6ld", cum.count[i]);
    count += cum.count[i];
    scr_printf("   %8ld", cum.weight[i]);
    weight += cum.weight[i];
    scr_printf("   %8ld", cum.solution[i]);
    time += cum.solution[i];
    scr_printf("     %8ld\n", cum.solution[i] * sysinfo.flow / 60);
    solution+=cum.solution[i] * sysinfo.flow / 60;
  }
  scr_curs(12 + i, 2);
  scr_printf("Totals                          %6ld   %8ld  %8ld     %8ld",count,weight,time,solution);
  hit_any_key(TRUE);

}

/* Printsout the dly file.
*/
void
printdly()
```

```c
{
  register i,
           j,
           fd;

char *asc_date(),
       *asc_time();

long     count,
           weight,
           solution,
           time,
           rcount,
           rweight,
           rsolution,
           rtime;

header("Print DLY File");

switch(access(fildly, 0))
  {
    case ERR:
/* DLY file not exist */
      center(13, 39, "No processing has occured.");
      hit_any_key(TRUE);
      return;
      break;

case 0:
/* DLY file exist    */
      if ((fd = open(fildly, O_RDONLY)) == ERR)
        fileerr("Error, in opening DLY file.");
  } rcount    = 0L;
  rweight   = 0L;
  rtime     = 0L;
  rsolution = 0L;
  for(j = read(fd, &dly, sizeof(dly)); j != 0; j =
```

```
read(fd, &dly, sizeof(dly)))
  {
    if (j == ERR)
       fileerr("Error, in reading DLY File");
    count    = 0L;
    weight   = 0L;
    solution = 0L;
    time     = 0L;
    scr_curs(8, 2);
    scr_printf("Plant ID: %-s", sysinfo.id);
    scr_curs(10, 2);
    scr_printf("Type                Date       Time
Count Weight(lb) Time(sec) Solution(L)");
    for(i = 0; i!= typenum; i++)
    {
       scr_curs(11 + i, 2);
       scr_printf("%-15s", typedat[i].type);
       scr_printf("  %8s", asc_date(&dly.date[i]));
       scr_printf("  %8s", asc_time(&dly.date[i]));
       scr_printf(" %6ld", dly.count[i]);
       count += dly.count[i];
       scr_printf("   %8ld", dly.weight[i]);
       weight += dly.weight[i];
       scr_printf("  %8ld", dly.solution[i]);
       time += dly.solution[i];
       scr_printf("    %8ld\n", dly.solution[i] *
  sysinfo.flow / 60);
       solution += dly.solution[i] * sysinfo.flow / 60;
    }
    scr_curs(12 + i, 2);
    scr_printf("Totals
%6ld   %8ld  %8ld    %8ld",count,weight,time,solution);
    rcount    += count;
    rweight   += weight;
    rtime     += time;
    rsolution += solution;
    scr_curs(14 + i, 2);
    scr_printf("Running Totals
```

```c
                %6ld    %8ld    %8ld      %8ld",count,weight,time,solution);
        if (ESC == hit_any_key(TRUE))
        {
           if (close(fd) == ERR)
              fileerr("Can't close DLY file");
           return;
        }
      }
      if (close(fd) == ERR)
         fileerr("Error, can't close DLY file");
      scr_curs(24, 0);
      scr_eol();
      hit_any_key(TRUE);
   } printlog()
{
   int i,
       flg,
       base;

char  c,
         buf[18],
         *asc_date(),
         *asc_time();

header("Print Operator log File");

scr_curs(7, 6);
   scr_puts("O)perator ");
   scr_curs(7, 16);
   reverse();
   scr_puts("                     ");
   normal();
   scr_curs(10, 10);
   scr_puts("Login              Logout
Login              Logout");
   scr_curs(11, 6);
```

```
    scr_puts("Date      Time      Date      Time
Date      Time      Date      Time");
    scr_curs(12, 0);
    scr_putc(204);
    scr_curs(12, 79);
    scr_putc(185);
    hline( 1, 12, 78, TRUE);
    vline( 3, 13, 10, FALSE);
    scr_curs(12,  3);
    scr_putc(209);
    scr_curs(23,  3);
    scr_putc(207);
    vline(12, 13, 10, FALSE);
    scr_curs(12, 12);
    scr_putc(209);
    scr_curs(23, 12);
    scr_putc(207);
    vline(21, 13, 10, FALSE);
    scr_curs(12, 21);
    scr_putc(209);
    scr_curs(23, 21);
    scr_putc(207);
    vline(30, 13, 10, FALSE);
    scr_curs(12, 30);
    scr_putc(209);
    scr_curs(23, 30);
    scr_putc(207);
    vline(39, 13, 10, FALSE);
    scr_curs(12, 39);
    scr_putc(209);
    scr_curs(23, 39);
    scr_putc(207);
    vline(40, 13, 10, FALSE);
    scr_curs(12, 40);
    scr_putc(209);
    scr_curs(23, 40);
    scr_putc(207);
    vline(43, 13, 10, FALSE);
```

```
scr_curs(12, 43);
scr_putc(209);
scr_curs(23, 43);
scr_putc(207);
vline(52, 13, 10, FALSE);
scr_curs(12, 52);
scr_putc(209);
scr_curs(23, 52);
scr_putc(207);
vline(61, 13, 10, FALSE);
scr_curs(12, 61);
scr_putc(209);
scr_curs(23, 61);
scr_putc(207);
vline(70, 13, 10, FALSE);
scr_curs(12, 70);
scr_putc(209);
scr_curs(23, 70);
scr_putc(207);
scr_echo(FALSE);
scr_curs(7, 16);
for(;;)
  switch(c = getkey())
  {
    case 'o':
    case 'O':
      center( 7, 59, "                             ");
      scr_curs(7, 16);
      reverse();
      scr_puts("                ");
      for(i = 0; i != 16; ++i)
      {
        scr_curs(7, 16 + i);
        c = getkey();
        if (c == ESC)
        {
          normal();
          scr_echo(TRUE);
          return;
```

```
              }
              if (c == '\r' || c == '\t')
                break;
              if (c == '\b')
              {
                if (i != 0)
                {
                  i-=1;
                  scr_curs(7, 16 + i);
                  scr_putc(' ');
                  scr_curs(7, 16 + i);
                  i-=1;
                }
              }
              else
              {
                buf[i] = toupper(c);
                scr_putc(toupper(c));
              }
            }
            buf[i] = '\0';
            normal();
            for(i = 0, flg = FALSE; (i <= 6) && (flg ==
FALSE); i++)
              if (!strcmp(oper[i].name, buf))
                flg = TRUE;
            i -= 1;
            if (!flg)
            {
              center( 7, 59, "Operator is not a valid
one.");
              break;
            }
            opnum = i;

if (oper[opnum].intime[0].pack  == 0L)
            {
```

```
          center(7, 59, "No processing has oc-
cured.");
          break;
      }
      base = 0;
      for (i = 0; i != 20; i++)
        prtlog(base + i, i);
      break;

case UP:
      if (base == 0)
        beep();
      else
      {
        base -= 10;
        for (i = 0; i != 20; i++)
          prtlog(i + base, i);
      }
      break;

case DOWN:
      if (base == 80)
        beep();
      else
      {
        base += 10;
        for (i = 0; i != 20; i++)
          prtlog(i + base, i);
      }
      break;

case ESC:
      scr_echo(TRUE);
      return;
    }
} prtlog(which, where)
int which, where;
```

```
{
    if (where < 10)
    {
      scr_curs(where + 13, 1);
      scr_printf("%2.2d", which);
      if (oper[opnum].intime[which].pack != 0L)
      {
        scr_curs(where + 13, 4);
        scr_printf("%s",
asc_date(&oper[opnum].intime[which]));
        scr_curs(where + 13, 13);
        scr_printf("%s",
asc_time(&oper[opnum].intime[which]));
        scr_curs(where + 13, 22);
        scr_printf("%s",
asc_date(&oper[opnum].outime[which]));
        scr_curs(where + 13, 31);
        scr_printf("%s",
asc_time(&oper[opnum].outime[which]));
      }
      else
      {
        scr_curs(where + 13, 4);
        scr_puts("          ");
        scr_curs(where + 13, 13);
        scr_puts("          ");
        scr_curs(where + 13, 22);
        scr_puts("          ");
        scr_curs(where + 13, 31);
        scr_puts("          ");
      }
    }
    else
    {
      scr_curs(where + 3, 41);
      scr_printf("%2.2d", which);
      if (oper[opnum].intime[which].pack != 0L)
      {
```

```c
            scr_curs(where + 3, 44);
            scr_printf("%s",
asc_date(&oper[opnum].intime[which]));
            scr_curs(where + 3, 53);
            scr_printf("%s",
asc_time(&oper[opnum].intime[which]));
            scr_curs(where + 3, 62);
            scr_printf("%s",
asc_date(&oper[opnum].outime[which]));
            scr_curs(where + 3, 71);
            scr_printf("%s",
asc_time(&oper[opnum].outime[which]));
        }
        else
        {
            scr_curs(where + 3, 44);
            scr_puts("         ");
            scr_curs(where + 3, 53);
            scr_puts("         ");
            scr_curs(where + 3, 62);
            scr_puts("         ");
            scr_curs(where + 3, 71);
            scr_puts("         ");
        }
    }
}
```

APPENDIX VII

~pumpio.asm

; Pump I/O functions.
;
; The following functions are supported:
;
; install()
; Install interrupts and close all pump valves.
;
; uninstall()
; Disable interrupt handler ONLY if all pumps are inactive.

```
; A -1 is returned on error.
;
; start(device, time)
; Actuate device open and leave open for (time/18.2) seconds, then
; actuate closed.  A device may not start if actuating, open, or
; paused.  A -1 is returned on error.
;
; stop(device)
; Actuate device closed.  A device may not be stopped if it is closing
; or closed.  A -1 is returned on error.
;
; pause(device)
; Actuate device closed and ignore until a resume() is performed.
; A device may not pause while stopping or inactive.  A -1 is returned
; on error.
;
; resume(device)
; Actuate device open and continue open count from start().  A device
; may not resume if not paused.  A -1 is returned on error.
;
; poll(device)
; Check device status.  The following values are returned:
; 0 = Inactive (closed, not paused).
; 1 = Active (open).
; 2 = Paused.
; 3 = Transition (opening or closing).
;
; Initialize the following global structure prior to installing the
; interrupt handler:
```

```
;
; struct {
;   unsigned int acttime;
;   unsigned int addr;
; } sysinfo;
;
; At this writing, the hardware was designed for sysinfo.addr = 768.
; Find the longest amount of (acttime/18.2 sec.) in which the pump is
; opening or closing to find the value for sysinfo.acttime.
;
; Legal device numbers are 1, 2, 3 and 4.  An illegal value could crash
; the system.  An uninstall() should be done before leaving the program,
; otherwise interrupts will still be active in the program's code segment
; and running another program could overwrite the routine.
;
; The install() function inserts the interrupt handler at the INT 1C
; interrupt vector, called by the TIMER_INT handler (INT 8) every 18.2
; seconds.  This 18.2 ticks/second value should be taken into
; consideration when calculating delay times.  All counters in the
; following routines work on the basis of one "tick".
;
   include lmacros.h
;
   P_ACINP    equ 1
   P_ACOUT    equ 2
   P_OPEN     equ 4
   P_PAWS     equ 8
;
```

```
  timer_int equ 4*1cH
;
dataseg   segment
  extrn sysinfo_:word
dataseg   ends
;;
; install interrupt
;;
  procdef install
  assume cs:codeseg, ds:dataseg
  push    es
  push    bp
  sub     ax,ax
  mov     es,ax
;
; set up all pumps to inactive
;
  mov     bp,offset sysinfo_
  mov     ax,ds:[bp]                    ; get sysinfo.acttime
  mov     p_acttime,ax                  ; save it in code seg
  mov     ax,ds:[bp]+2                  ; get sysinfo.addr
  mov     p_addr,ax                     ; save it in code seg
;
  mov     p_mode+0,0                    ; clear pump status
  mov     p_mode+1,0
  mov     p_mode+2,0
  mov     p_mode+3,0
;
; set interrupt data
;
  mov     bp,offset timer_int
  mov     ax,es:[bp]                    ; get old offset
  mov     cx,es:[bp]+2                  ; get old
```

```
segment
  mov     cs:word ptr timer_vector,ax      ; save 'em
  mov     cs:word ptr timer_vector+2,cx
;
; insert interrupt handler
;
  cli
  mov     es:[bp],offset daemon            ; set new offset
  mov     es:[bp]2,cs                      ; set new segment
  sti
;
; exit
;
  call    unpump                           ; close all pumps
  mov     ax,0                             ; no error
  pop     bp
  pop     es
  pret
;
; data
;
  timer_vector  dd ?           ; old timer vector
  p_addr        dw ?           ; pump base address
  p_mode        db 4 dup(?)    ; mode bits
  p_acinp       dw 4 dup(?)    ; actuate-open count
  p_acout       dw 4 dup(?)    ; actuate-closed count
  p_open        dw 4 dup(?)    ; open timer count
  p_acttime     dw 4 dup(?)    ; total actuation time
;
  pend    install
;;
; uninstall interrupt
;;
  procdef uninstall
  assume cs:codeseg, ds:nothing
```

```
    push    es
    push    bp
    sub     ax,ax
    mov     es,ax                       ; es = zero segment, totally
;
    mov     bx,4
unin_loop:
    mov     al,p_mode[bx-1]
    or      al,al                       ; anything going on?
    jnz     unin_err                    ; stuff is still happening
    dec     bx
    jnz     unin_loop                   ; not done yet
;
; get old interrupt vector
;
    mov     bp,offset timer_int
    mov     ax,cs:word ptr timer_vector
    mov     cx,cs:word ptr timer_vector+2
;
; restore old interrupt vector
;
    cli
    mov     es:[bp],ax
    mov     es:[bp]2,cx
    sti
;
    mov     ax,0    ; no error
unin_end:
    pop     bp
    pop     es
    pret
unin_err:
    mov     ax,-1
    jmp     unin_end
    pend    uninstall
;;
```

```
; close all pumps, who cares what they're up to
;;
unpump    proc
  assume  cs:codeseg, ds:nothing
  push    bx
  mov     bx,4
unpump_loop:
  call    unone
  dec     bx
  jnz     unpump_loop
  pop     bx
  ret
unpump    endp
;;
; close just one pump
;;
unone     proc
  assume  cs:codeseg, ds:nothing
  push    ax
  push    dx
  push    di
  mov     ax,p_acttime              ; acttime
  mov     di,bx
  shl     di,1                      ; di = bx * 2
unone_noac:
  test    p_mode[bx-1],P_ACINP
  jnz     unone_noac                ; pump still acc-open
;
  mov     dx,p_addr                 ; dx = sysinfo.addr
  add     dx,di                     ; dx += di
  dec     dx                        ; dx -= 1
  out     dx,al                     ; actuate closed
;
  cli                               ; don't bother us while
we're playing
  mov     p_mode[bx-1],P_ACOUT      ; set flag
  mov     p_acout[di-2],ax          ; set actuate time
  sti                               ; let all the Reindeer
play
```

```
unone_stop:
    mov     al,p_mode[bx-1]
    or      al,al                       ; anything going on?
    jnz     unone_stop                  ; not stopped yet
;
    pop     di
    pop     dx
    pop     ax
    ret
unone   endp
;;
; pause device
;;
    procdef pause,<<padev_no,word>>
    assume  cs:codeseg, ds:nothing
    push    di
    mov     ax,-1                       ; in case of error
    mov     di,padev_no                 ; di = dev
    test    p_mode[di-1],P_ACOUT
    jnz     pause_end                   ; closing
    test    p_mode[di-1],P_ACINP+P_OPEN
    jz      pause_end                   ; not open/opening
    or      p_mode[di-1],P_PAWS         ; pause
    mov     ax,0                        ; no error
pause_end:
    pop     di
    pret
    pend    pause
;;
; resume device
;;
    procdef resume,<<redev_no,word>>
    assume  cs:codeseg, ds:nothing
    push    di
    mov     ax,-1                       ; in case of error
```

```
        mov     di,redev_no
        mov     bx,di                   ; bx = dev
        shl     di,1                    ; di = dev * 2
        test    p_mode[bx-1],P_PAWS     ; paused?
        jz      resume_end
;
        mov     ax,p_acttime            ; ax = sysinfo.acttime
        mov     p_acinp[di-2],ax        ; set acinp timer
        mov     p_acout[di-2],ax        ; set acout timer
        xor     p_mode[bx-1],P_PAWS     ; turn off pause
        or      p_mode[bx-1],P_ACINP    ; turn on acinp
;
        mov     dx,p_addr
        add     dx,di
        sub     dx,2
        out     dx,al                   ; act open
        mov     ax,0                    ; no error
resume_end:
        pop     di
        pret
        pend    resume
;;
; poll device
;;
        procdef poll,<<podev_no,word>>
        assume  cs:codeseg, ds:nothing
        mov     bx,podev_no             ; bx = dev
        mov     al,p_mode[bx-1]         ; al = status
        test    al,P_ACINP+P_ACOUT
        jnz     poll_tran               ; in transition
        test    al,P_PAWS
        jnz     poll_pause              ; paused
        test    al,P_OPEN
        jnz     poll_active             ; active (open)
        mov     ax,0                    ; inactive
        pret
poll_tran:
        mov     ax,3
        pret
```

```
poll_pause:
    mov     ax,2
    pret
poll_active:
    mov     ax,1
    pret
    pend    poll
;;
; start device
;;
    procdef start,<<stdev_no,word>,<sttime_no,word>>
    assume  cs:codeseg, ds:nothing
    push    di
    mov     cx,sttime_no                    ; cx = open time
    mov     di,stdev_no
    mov     bx,di                           ; bx = dev
    shl     di,1                            ; di = dev * 2
    mov     al,p_mode[bx-1]                 ; get status
    or      al,al                           ; check status
    jnz     start_err                       ; if something's going on
;
    mov     ax,p_acttime                    ; ax = sysinfo.acttime
    mov     p_acinp[di-2],ax                ; set tran time, act open
    mov     p_acout[di-2],ax                ; set tran time, act closed
    xor     p_mode[bx-1],P_ACINP            ; status = act open
    mov     ax,cx
    mov     p_open[di-2],ax                 ; set open time
;
    mov     dx,p_addr                       ; get
```

```
sysinfo.addr
    add     dx,di
    sub     dx,2
    out     dx,al                           ; open valve
    mov     ax,0
start_end:
    pop     di
    pret
start_err:
    mov     ax,-1                           ; return error code
    jmp     start_end
    pend    start
;;
; stop device
;;
    procdef stop,<<sodev_no,word>>
    assume  cs:codeseg, ds:nothing
    mov     ax,-1                           ; in case of error
    mov     bx,sodev_no                     ; di = dev
    test    p_mode[bx-1],P_PAWS
    jz      stop_chk                        ; paused
    mov     p_mode[bx-1],0
    jmp     stop_done
stop_chk:
    test    p_mode[bx-1],P_ACINP+P_OPEN jz      stop_end                        ; not opening/open
    call    unone                           ; close device
stop_done:
    mov     ax,0                            ; no error
stop_end:
    pret
    pend    stop
;;
```

```
; timer handler
;;
daemon      proc far
  assume cs:codeseg, ds:nothing
  mov       th_bx,bx              ; save registers
  mov       th_dx,dx
  mov       th_di,di
;
  mov       bx,0                  ; bx = (dev - 1)
  mov       di,0                  ; di = (dev - 2) * 2
th_loop:
  test      p_mode[bx],P_ACINP    ; actuating open?
  jnz       th_acinp
  test      p_mode[bx],P_ACOUT    ; actuating closed?
  jnz       th_acout
  test      p_mode[bx],P_OPEN     ; opening?
  jnz       th_open
th_next:
  add       di,2                  ; di += 2
  inc       bx                    ; bx++
  cmp       bx,4                  ; if(bx != 4)
  jnz       th_loop               ;   do more
;
  mov       di,th_di              ; reclaim registers
  mov       dx,th_dx
  mov       bx,th_bx
  jmp       timer_vector          ; pass interrupt on to dos
;
th_acinp:
  dec       p_acinp[di]           ; decrement count
  jnz       th_next               ; if still counting
  xor       p_mode[bx],P_ACINP    ; done with acinp
  or        p_mode[bx],P_OPEN     ; ready to start open timer
  jmp       th_next               ; continue
th_acout:
  dec       p_acout[di]           ; decrement count
```

```
        jnz     th_next                 ; if still counting
        xor     p_mode[bx],P_ACOUT      ; done with acout
        jmp     th_next                 ; continue
th_open:
        test    p_mode[bx],P_PAWS       ; paused?
        jnz     th_paws                 ; yup, better shut down
        dec     p_open[di]              ; decrement counter
        jnz     th_next                 ; if still counting
th_paws:
        xor     p_mode[bx],P_OPEN       ; done being open
        or      p_mode[bx],P_ACOUT      ; time to acout
        mov     dx,p_addr               ; dx = sysinfo.addr
        add     dx,di
        inc     dx
        out     dx,al                   ; actuate closed
        jmp     th_next                 ; continue
;
th_di   dw      ?                       ; saved register values
th_dx   dw      ?
th_bx   dw      ?
;
daemon endp
;
    finish
```

APPENDIX VIII

~input.c

```c
#include  <sub.h>
/*
Routine: input(indat)
  0 -- Any valid alpha character forced to lower case.
  1 -- Any valid alpha character forced to upper case.
  2 -- Any valid alpha character.
  3 -- Special Input  'AAA-NN-NNNN' would look like
Oct-13-1963.
        A -- Any printable character.
        N -- Any valid digits.
        * -- Anything, is printed out.
            No printable character in the first field.
  4 -- Any valid printable character forced to lower
case.
  5 -- Any valid printable character forced to upper
case.
  6 -- Any valid printable character.
  7 -- Any Valid digit.
  8 -- Any Valid digit and +,-
*/ static int cur;

char
input(indat)
struct input_record *indat;
{
  char  c,
        c1,
        string[32],
        bstring[32],
        appstr(),
        *itoa();
```

```
   register i,
           flg;

void putcur(),
           shiftl(),
           shiftr();

string[0] = '\0';
   scr_echo(0);
   reverse();
   scr_curs(indat->ycor,indat->xcor);
   fputs(indat->title, stdout);
   /*                           Setup Back Space String
*/ if (indat->com.typ == 3)
   {
     indat->len = strlen(indat->special);
     for (i = 0; i != indat->len; i++)
     {
       c = toupper(indat->special[i]);
       if (c == 'N' || c == 'A')
          bstring[i]=' ';
       else
          bstring[i] = indat->special[i];
     }
   }
   else
      for(i = 0; i != indat->len; i++)
         bstring[i] = ' ';
   bstring[indat->len] = '\0';

/*                            Setup Input String
*/
   if (indat->com.sho)
   {
     switch (indat->com.typ)
     {
```

```
      case 7:
      case 8:
        strcpy(string, itoa(indat->rtn.in));
        break;

default:
        strcpy(string,indat->rtn.str);
    }
    cur = strlen(string);
    for (i = 0; i != cur; i++)
      scr_putc(string[i]);
  }
  else
    cur = 0;
  for (i = cur; i != indat->len; i++)
  {
    string[i] = FILL;
    scr_putc(bstring[i]);
  }
  string[indat->len] = '\0';
  putcur(indat);

/*                              Input things
*/
  for(flg = TRUE; flg;)
  {
    switch(c = scr_getc())
    {
      case '\b':
        if (cur > 0)
  {
    for (cur -= 1; bstring[cur] != ' '; cur--)
      ;
    string[cur] = FILL;
    putcur(indat);
    scr_putc(bstring[cur]);
    putcur(indat);
```

```
      }
    else
      beep();
    flg = 2;
    break;

case ESC:
  flg = FALSE;
  break;

case '\r':
case '\t':
  if (c == '\r' && indat->com.tab)
  {
    beep();
    flg = 2;
    break;
  }
  if (c == '\t' && indat->com.rtn)
  {
    beep();
    flg = 2;
    break;
  }
  if (indat->com.ent && string[0] == '\0')
  {
    beep();
    flg = 2;
    break;
  }
  flg = FALSE;
  break;

case LEF:
  if (cur == 0)
    beep();
  else
  {
```

```c
      for (cur -= 1; bstring[cur] != ' '; cur--)
        ;
      putcur(indat);
    }
    flg = 2;
    break;

case RIG:
    if (cur == indat->len-1)
      beep();
    else
    {
      for (cur += 1; bstring[cur] != ' '; cur++)
        ;
      putcur(indat);
    }
    flg = 2;
    break;

case INS:
    shiftl(string, bstring, indat);
    flg = 2;
    break;

case DEL:
    shiftr(string, bstring, indat);
    flg = 2;
    break;
} /* end switch */ if (flg == 2)
{
  flg = TRUE;
  continue;
}
if (flg == FALSE)
  break;
```

```
switch(indat->com.typ)
{
   case 0:
   case 1:
   case 2:
     if (indat->com.typ == 0)
       c = tolower(c);
     if (indat->com.typ == 1)
       c = toupper(c);
     if (isalpha(c) || c == ' ')
       appstr(string, c, indat);
     else
       beep();
     break;

case 3: /* special input */
     if (cur < indat->len)
     {
       for (; bstring[cur] != ' '; cur++)
         ;
       switch(toupper(indat->special[cur]))
       {
   case 'A':
     if (isprint(c))
       appstr(string, c, indat);
     else
       beep();
     break;

case 'N':
     if (isdigit(c))
       appstr(string, c, indat);
     else
       beep();
   }
 }
else
   beep();
break;
```

```
    case 4:
    case 5:
    case 6:
      if (indat->com.typ == 4)
        c = tolower(c);
      if (indat->com.typ == 5)
        c = toupper(c);
      if (isprint(c))
        appstr(string, c, indat);
      else
        beep();
      break;

case 7:
    case 8:
      if (isdigit(c))
      {
          appstr(string, c, indat);
          break;
      }
      else
        if (indat->com.typ == 8 && (c == '+' || c ==
'-'))
        {
          appstr(string, c, indat);
          break;
        }
      beep();
      break;
    } /* end switch */
  } /* end for */

/*      Strip leading and trailing spaces--Setup
return value        */
  i = indat->len-1;
  if (string[i] == ' ' || string[i] == FILL)
  {
    for(i-=1; (i != -1) && (string[i] == ' ' ||
string[i] == FILL); i--)
```

```
              ;
    string[i + 1] = '\0';
  }
  for(i = 0; i != strlen(string); i++)
    if (string[i] == FILL)
      string[i] = ' ';
  switch (indat->com.typ)
  {
    case 7:
    case 8:
      indat->rtn.in = atoi(string);
      break;
    default:
      strcpy(indat->rtn.str,string);
  }
  scr_curs(indat->ycor, indat->xcor + strlen(indat->title));
  scr_puts(bstring);
  scr_curs(indat->ycor, indat->xcor + strlen(indat->title));
  scr_puts(string);
  normal();
  return(c);
}

/*  appends an char on to the input string and outputs
it to console */
/*  used with input the routine
*/
char
appstr(str, c, indat)
struct input_record *indat;
char *str, c;
{
  void putcur();

if (cur<indat->len)
  {
```

```c
      str[cur]=c;
      putcur(indat);
      scr_putc(c);
      cur+=1;
      putcur(indat);
    }
    else
      beep();
 }
/*                Move cusor to cur on screen
*/
void
putcur(indat)
struct input_record *indat;
{
  if (cur >= indat->len)
  {
    cur=indat->len-1;
    beep();
  }
  scr_curs(indat->ycor,indat->xcor + strlen(indat->title) + cur);
}

/* Moves the input string to the right around special
input string */
void
shiftr(str, bstr, indat)
struct input_record *indat;
char *str, *bstr;
{
 register  i,
           endfld,
           oldcur;
   void putcur();

if (indat->com.typ == 3)
    {
```

```
for(endfld = cur; bstr[endfld] == ' '; endfld++)
    ;
endfld-=1;
if (endfld - cur == 0)
{
      putcur(indat);
      scr_putc(bstr[cur]);
      putcur(indat);
      str[cur] = FILL;
      return;
    }
  }
  else
    endfld = indat->len-1;

oldcur = cur;
  for(i = cur; i != endfld; i++)
    str[i] = str[i+1];
  str[endfld] = FILL;
  for(cur = endfld; cur >= oldcur; cur--)
  {
    putcur(indat);
    if (str[cur] == FILL)
      scr_putc(bstr[cur]);
    else
      scr_putc(str[cur]);
  }
  cur = oldcur;
  putcur(indat);
}
/* Moves the input string to the left around special
input string */
void
shiftl(str, bstr, indat)
char *str, *bstr;
struct input_record *indat;
{
  register i,
           endfld,
```

```
      oldcur;
   void putcur();

if (indat->com.typ == 3)
   {
      for(endfld = cur; bstr[endfld] == ' '; endfld++)
         ;
      endfld -= 1;
      if (endfld - cur == 0)
      {
         putcur(indat);
         scr_putc(bstr[cur]);
         putcur(indat);
         str[cur] = FILL;
         return;
      }
   }
   else
      endfld = indat->len-1;
   oldcur = cur;
   for(i=endfld-1; i>=cur; i--)
      str[i + 1] = str[i];
   str[cur] = FILL;
   for(cur = endfld; cur >= oldcur; cur--)
   {
      putcur(indat);
      if (str[cur] == FILL)
         scr_putc(bstr[cur]);
      else
         scr_putc(str[cur]);
   }
   cur = oldcur;
   putcur(indat);
} char *
   itoa(value)
   int value;
   {
```

```
      static char buff[10];
      register char c,
                    s;
      register i;

buff[9] = 0;
      i = 9;
      if (value < 0)
         s = '-';
      value = (value < 0) ? -value: value;
      while (value != 0 || i == 9)
      {
         c = value % 10  + '0';
         buff[--i] = c;
         value /= 10;
      }
      if (s == '-')
         buff[--i] = s;
      return (buff + i);
   }
```

APPENDIX IX

```
~tim.c
include  <sub.h> char *
asc_date(date)
union t_time  *date;
{
   static char buf[10];

sprintf(buf, "%02d/%02d/%02d",
      date->unpack.month, date->unpack.day, date->unpack.year + 80);
   return(buf);
} set_date(date, m, d, y)
union t_time  *date;
```

```
int m, d, y;
{
  date->unpack.month  = m;
  date->unpack.day    = d;
  date->unpack.year   = y - 80;
} char *
asc_time(date)
union t_time  *date;
{
  int h;
  static char buf[10];

if (date->unpack.hours > 12)
    h = date->unpack.hours - 12;
  else
    h = date->unpack.hours;
  sprintf(buf, "%02d:%02d:%02d",
    h, date->unpack.minutes, date->unpack.seconds * 2);
  return(buf);
} set_time(date, h, m, s)
union t_time  *date;
int h, m, s;
{
  date->unpack.hours    = h;
  date->unpack.minutes  = m;
  date->unpack.seconds  = s / 2;
} long
get_time_date(date)
union t_time  *date;
{
  long  time();

return(time(date));
}
```

APPENDIX X

~sound.asm

```
;********************************************************************
;
;   sound( frequency, duration )
;   unsigned int frequency, duration;
;
;   This procedure produces a tone on the speaker in the IBM box.
;   The frequency range is from 21 to 65535 hertz, and the duration range is
;   from 0 to 65535 hundredths of a second.
;
;********************************************************************
CODESEG segment word public 'code'
        public    sound_ sound_      proc      near push    bp
        mov     bp,sp                ; Point at our parameters
        push    di mov     bx,word ptr [bp + 6] ; BX gets the duration in hundredths
                                     ; of a second
        mov     di,word ptr [bp + 4] ; DI gets the frequency
                                     ; from 21 to 65535 Hertz
        mov     al,0b6h              ; Write timer mode register
        out     43h,al
        mov     dx,14h               ; Timer divisor =
```

1331000/frequency
```
        mov     ax,4f38h
        div     di
        out     42h,al                  ; Write timer 2 low byte
        mov     al,ah
        out     42h,al                  ; Write timer 2 high byte
        in      al,61h                  ; Get current Port B setting
        mov     ah,al                   ; Save in al
        or      al,3
        out     61h,al                  ; Turn speaker on pause:  mov     cx,2801                 ; Count out 1/100 of a second spkr_on:
        loop    spkr_on
        dec     bx      ; Are we done yet?
        jnz     pause mov     al,ah    ; Recover previous port value
        out     61h,al xor     ax,ax
        pop     di
        pop     bp      ; Restore registers
        ret             ; Boot the parameters off of the stack sound_  endp                            ; End of sound procedure
CODESEG ends
        end
```

APPENDIX XI

~extern.h

```c
extern struct menurecord *menudata;    /* Used for keeping the menu data */
extern struct operrecord oper[6];      /* Used for keeping the operator  */
extern int opnum;
extern struct pwrecord pw[6];          /* Used for keeping the passwords */
extern int pwnum;
extern struct systemrecord sysinfo;    /* Used for keeping the plant ID  */
extern struct typerecord *typedat;     /* Used for keeping the type table*/
extern int typenum;
extern struct cumrecord cum;           /* Used for the CUM file */
extern char filcum[16];
extern struct dlyrecord dly;           /* Used for the DLY file */
extern char fildly[16];
```

APPENDIX XII

~input.h

```c
#define TRUE   1
#define FALSE  0
#define DOWN   -48
#define UP     -56
#define LEF    -53
#define RIG    -51
#define INS    -46
#define DEL    -45
#define FILL   '_'
define ESC    27 union rtnpt
{
   char    str[31];
```

```c
    int     in;
};

struct com_record
{
   unsigned int typ:4;    /* Type of input -- look at in-
put.c for more info */
   unsigned int rtn:1;    /* Must hit return -- TRUE or
FASLE                   */
   unsigned int tab:1;    /* Must hit tab -- TRUE or
FASLE                   */
   unsigned int ent:1;    /* Must enter this field --
TRUE or FASLE           */
   unsigned int sho:1;    /* Show whats in the rtn union
*/
};

struct input_record
{
   int xcor, ycor, len;
   char title[31], special[31];
   union   rtnpt rtn;
   struct com_record com;
};
```

APPENDIX XII

~sub.h

```c
#include <stdio.h>
#include <color.h>
#include <time.h>
#include <input.h>
#include <ctype.h>
#include <fcntl.h>
#include <errno.h>
include <signal.h> define u_line()  scr_setatr(BLACK, BLUE , LOW, NO_BLINK)
define reverse() scr_setatr(WHITE, BLACK, LOW,
```

NO_BLINK)
define h_int()    scr_setatr(BLACK, WHITE, HIGH, NO_BLINK)
define normal()   scr_setatr(BLACK, WHITE, LOW, NO_BLINK)
define HD
define ESC       27
define DOWN      -48
define UP        -56
define LEFT      -53
define RIGHT     -51
define F1        -69
define F2        -68
define F3        -67
define F4        -66
define F5        -65
define F6        -64
define F7        -63
define F8        -62
define F9        -61
define F10       -60
define TRUE      1
define FALSE     0
define ERR       -1
define MONO      7
define MAXSUB    16
define MAXTYP    16
define MAXOPER   100 union t_time                                     /* Used for time functions */
{
  unsigned long pack;
  struct
  {
    int t,
        d;
  } semi;

```
    struct
    {
      unsigned  seconds :5,
                minutes :6,
                hours   :5,
                day     :5,
                month   :4,
                year    :7;
    } unpack;
};

struct entryrecord                                              /* Used
for the menu sub. */
{
  char title[32];
  char selc;
};

struct menurecord
{
  char header[32];
  int etnum,
      xcor,
      ycor,
      step;
  struct entryrecord entry[8];
};

struct pwrecord                                                 /* Used
for the password. */
{
  char title[18];
  union t_time date;
};

struct operrecord                                               /* Used
for the operator. */
{
```

```
    char name[18];
    union t_time intime[MAXOPER];
    union t_time outime[MAXOPER];
};

struct systemrecord                                    /* Used
for the system */
{
    unsigned  acttime,
              addr;

int valnum,
        flow;

char *id;
};

struct typerecord                                      /* Used
for the type table*/
{
    char  *type,
          *stype[MAXSUB];
    int snum,
        min,
        max,
        yint[MAXSUB],
        slope[MAXSUB];
};

struct cumrecord                                       /* Used
for the CUM file */
{
    long  count[MAXTYP],
          weight[MAXTYP],
          solution[MAXTYP];
    union t_time  date[MAXTYP];
};
```

```
struct dlyrecord                              /* Used
    for the DLY file */
{
    long    count[MAXTYP],
            weight[MAXTYP],
            solution[MAXTYP];
    union t_time  date[MAXTYP];
};
```

What is claimed is:

1. Apparatus for injection of treatment solution into slaughtered animals comprising:
a container for holding a quantity of treatment solution;
means for establishing flow of solution from the container source;
automatic valve means for receiving the flow of solution, the valve means including control means for downstream pressure control of the solution flow;
header means for receiving solution flow from the control valve;
conduit means joining the header means to container for recirculating solution thereto;
pressure sensing means positioned proximate the joining area of the header means and conduit means thereat for sensing pressure;
control line means connecting the pressure sensing means to the control means to the automatic valve whereby pressure downstream of the control valve is controlled to a steady value, and
at least one dispensing conduit means connected to the header means for accepting solution therefrom at controlled pressure and being constructed and arranged for injecting the solution into the circulatory system of a slaughtered animal.

2. The apparatus of claim 1 wherein:
the header means comprises paired conduit means for establishing branched flow of the solution therethrough,
the conduit means joining the header means joins downstream portions of the paired conduit means whereby flow therethrough is brought together for recirculating to the container, and
the pressure sensing means is positioned proximate the joining area and the point at which flow through the paired conduit means meets, in the vicinity of the connection to the recirculation line.

3. Apparatus for injection treatment solution into slaughtered animals comprising:
container means for holding a quantity of a treatment solution and including an outlet;
a pump having an inlet and outlet;
first conduit means connecting the pump inlet to the container outlet for transferring solution from the container to the pump;
automatic control valve means having an inlet and outlet and including pilot control means for downstream pressure control;
second conduit means connecting the pump outlet to the control valve inlet for transferring solution from the pump to the control valve;
header means comprising paired conduit means having a common outlet for establishing branched flow of the solution through the paired conduit means;
third conduit means connecting the outlet of the control valve to the paired conduit means for introducing solution into the header means;
fourth conduit means connected to the common outlet of the header means for receiving solution from the header means;
pressure sensing means positioned proximate the common outlet,
control line means connecting the pressure sensing means to the control means of the automatic control valve whereby pressure downstream of the control valve is controlled to a steady value, and
at least one dispensing conduit means connected to the header means for accepting solution therefrom at controlled pressure and being constructed and arranged for injecting the solution into the circulatory system of a slaughtered animal.

4. The apparatus of claim 3 including timing means for controlling the length of flow time through the dispensing conduit means whereby the controlled pressure and time provide the dispensing of controlled amounts of solution.

5. Apparatus for injection of treatment solution into slaughtered animals, comprising:
container means for holding a quantity of a treatment solution and including an outlet;
a pump having an inlet and outlet;
first conduit means connecting the pump inlet to the container outlet for transferring solution from the container to the pump;
automatic control valve means having an inlet and outlet and including control means for downstream pressure control;
second conduit means connecting the pump outlet to the control valve inlet for transferring solution from the pump to the control valve;
header means comprising paired conduit means having a common inlet and outlet for establishing branched flow of the solution through the paired conduit means;
third conduit means connecting the outlet of the control valve to the common inlet of the header means for introducing solution into the header means;
fourth conduit means connected to the common outlet of the header means for receiving solution from the header means;
pressure sensing means positioned proximate the common outlet, control line means connecting the pressure sensing means to the control means of the automatic control valve whereby pressure downstream of the control valve is controlled to a steady value, and at least one dispensing conduit means terminating in solution injection nozzle means, the conduit means being connected to the header means for accepting solution therefrom at controlled pressure and being constructed and arranged for injecting the solution into the circulatory system of a slaughtered animal via the nozzle means.

6. Apparatus for injection of treatment solution into slaughtered animals, comprising:

container means for holding a quantity of a treatment solution and including an inlet and an outlet;

a pump having an inlet and outlet;

first conduit means connecting the pump inlet to the container outlet for transferring solution from the container to the pump;

automatic control valve means having an inlet and outlet and including pilot control means for downstream pressure control;

second conduit means connecting the pump outlet to the control valve inlet for transferring solution from the pump to the control valve;

header means comprising paired conduit means having a common inlet and outlet for establishing branched flow of the solution through the paired conduit means;

third conduit means connecting the outlet of the control valve to the common inlet of the header means for introducing solution into the header means;

fourth conduit means connecting the common outlet of the header means to the container inlet for recirculating treatment solution after passing through the header means;

pressure sensing means positioned proximate the common outlet, control line means connecting the pressure sensing means to the pilot control means of the automatic control valve whereby pressure downstream of the control valve is controlled to a steady value, and at least one dispensing conduit means terminating in solution injection nozzle means, the conduit means being connected to the header means for accepting solution therefrom at controlled pressure and being constructed and arranged for injecting the solution into the circulatory system of a slaughtered animal via the nozzle means.

7. The apparatus of claim 6 including valve means for controlling the flow of solution from the header conduit means through the dispenser conduit means and the injection means.

8. The apparatus of claim 7 in which the valve means is electrically controlled.

9. The apparatus of claim 8 including computer means for maintaining electrical control of the valve means.

10. The apparatus of claim 7 including a plurality of separate dispenser conduit means and injection means connected to the header conduit means and corresponding separate valve means controlling the flow therethrough.

11. The apparatus of claim 10 in which the separate value means are each electrically controlled.

12. The apparatus of claim 11 including computer means for maintaining control of the separate valve means.

13. The apparatus of claim 6 including means associated with the solution for cooling it below ambient.

14. The apparatus of claim 6 in which the injection nozzle terminates in a self-piercing tip.

15. Apparatus for injecting treatment solution into a plurality of slaughtered animals, the apparatus comprising:

solution handling means including header means for receiving solution flow from a control valve, conduit means joining the header means to a container for recirculating solution thereto, pressure sensing means positioned proximate the joining area of the header means and the conduit means for sensing pressure, and a plurality of electrically operated valves, each valve being constructed and arranged for controlling the flow of solution to an individual animal;

control means operably connected to the valves for opening and closing the valves;

programmed means operably connected to the control means, the programmed means comprising:

computer means including data entry means for entering input data concerning at least the type and weight of animal, and an application program comprising operating instructions for the computer means and stored data representative of at least various durations of time for a variety of animals' types and weights;

means responsive to input data received by the data entry means for selecting a duration of time from the stored data;

counter means for receiving the selected duration of time;

means responsive to the counter means for interacting with the control means to operate the valve for a predetermined duration of time to control flow of solution into the circulatory system of the animal whereby the computer operates the control means upon initiation of an operator.

16. Apparatus for injecting treatment solution into a plurality of slaughtered animals, the apparatus comprising:

solution handling means including header means for receiving solution flow from a control valve, conduit means joining the header means to a container for recirculating solution thereto, pressure sensing means positioned proximate the joining area of the header means and the conduit means for sensing pressure, and a plurality of electrically operated valves, each valve being constructed and arranged for controlling the flow of solution to an individual animal;

control means operably connected to the valves for opening and closing the valves;

programmed means operably connected to the control means, the programmed means comprising:

computer means including data entry means for entering data and a program;

means responsive to data received by the data entry means for selecting a duration of time;

means responsive to operator input for interacting with the control means to operate a valve for a length of time corresponding to the selected duration of time to control the flow of solution into the circulatory system of an animal.

17. Apparatus for injecting treatment solution into a plurality of slaughtered animals, the apparatus comprising:

solution handling means including header means for receiving solution flow from a control valve, conduit means joining the header means to a container for recirculating solution thereto, pressure sensing means positioned proximate the joining area of the header means and the conduit means for sensing pressure, and a plurality of electrically operated valves, each valve being constructed and arranged for controlling the flow of solution to an individual animal;

control means operably connected to the valves for opening and closing the valves;

programmed means operably connected to the control means, the programmed means comprising:

microcomputer means including a keyboard for entering data concerning the type and weight of an animal, and a program comprising operating instructions for the microcomputer means and stored data representative of various durations of time associated with a variety of animal types and weights;

means responsive to data received by the keyboard for selecting a duration of time from the stored data;

means responsive to operator input for interacting with the control means to operate a valve for a length of time corresponding to the selected duration of time to control the flow of solution into the circulatory system of an animal.

18. The apparatus of claim 17 further including means for generating accounting records relating to the type of animal processed and the amount of solution used.

19. The apparatus of claim 18 wherein the accounting records further comprise a daily account record and a cumulative account record.

20. The apparatus of claim 17 further including a modem, means responsive to the modem for the remote control of the apparatus and the transfer of account information to the remote control site.

21. The apparatus of claim 17 further including password protection such that only an authorized operator may input data.

22. The apparatus of claim 17 further including means responsive to the keyboard for interrupting the flow of solution into an animal further including means responsive to the keyboard for re-establishing the flow of solution for the remainder of the duration of time.

23. Apparatus for injecting treatment solution into a plurality of slaughtered animals, the apparatus comprising:

solution handling means including header means for receiving solution flow from a control valve, conduit means joining the header means to a container for recirculating solution thereto, pressure sensing means positioned proximate the joining area of the header means and the conduit means for sensing pressure, and a plurality of electrically operated valves, each valve being constructed and arranged for controlling the flow of solution to an individual animal;

control means operably connected to the valves for opening and closing the valves;

programmed means operably connected to the control means, the programmed means comprising:

computer means including data entry means for entering data concerning at least the type and weight of animal, and an application program comprising operating instructions for the computer means and stored data representative of various durations of time associated with at least a variety of animals'-types and weights;

means responsive to input data received by the data entry means for selecting a duration of time from the stored data;

counter means for receiving the selected duration of time;

means responsive to the counter means for interacting with the control means to operate the valve for a predetermined duration of time to control flow of solution into the circulatory system of the animal whereby the computer operates the control means upon initiation of an operator.

* * * * *